(12) United States Patent
Blatchley, III et al.

(10) Patent No.: US 10,662,100 B2
(45) Date of Patent: May 26, 2020

(54) CHLORINATION-UV PROCESS FOR DECOMPOSITION AND DETOXIFICATION OF MICROCYSTIN-LR

(71) Applicant: Purdue Research Foundation, West Lafayette, IN (US)

(72) Inventors: Ernest Rowland Blatchley, III, West Lafayette, IN (US); Jing Li, Beijing (CN); Jer-Yen Yang, West Lafayette, IN (US); Xinran Zhang, Guangzhou (CN)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 15/686,203

(22) Filed: Aug. 25, 2017

(65) Prior Publication Data

US 2018/0127293 A1    May 10, 2018

Related U.S. Application Data

(60) Provisional application No. 62/379,809, filed on Aug. 26, 2016.

(51) Int. Cl.
| | |
|---|---|
| *C02F 1/32* | (2006.01) |
| *C02F 9/00* | (2006.01) |
| *C02F 1/76* | (2006.01) |
| C02F 101/30 | (2006.01) |
| C02F 1/72 | (2006.01) |
| C02F 1/66 | (2006.01) |

(52) U.S. Cl.
CPC ............. *C02F 9/00* (2013.01); *C02F 1/32* (2013.01); *C02F 1/76* (2013.01); C02F 1/66 (2013.01); C02F 1/725 (2013.01); C02F 2101/30 (2013.01)

(58) Field of Classification Search
CPC ...... C02F 1/72; C02F 1/32; C02F 1/50; C02F 9/00; C02F 1/76; C02F 1/725; C02F 1/66; C02F 2101/30; G01N 33/18; G05D 11/08
See application file for complete search history.

(56) References Cited

FOREIGN PATENT DOCUMENTS

KR    20150122876 A    * 11/2015

OTHER PUBLICATIONS

KR-20150122876-A KR; Kwon Min Hwan; english translation (Year: 2015).*
Li and Blatchley III, "UV photodegradation of inorganic chloramines." Environ. Sci. Technol. 2009, 43 (1), 60-65.

(Continued)

*Primary Examiner* — Cameron J Allen
(74) *Attorney, Agent, or Firm* — Thomas|Horstemeyer, LLP

(57) ABSTRACT

Provided is an ordered step-wise method for the chlorination and photodestruction of MC-LR contamination of an aqueous liquid such as a potable water supply infested with blue-green algae (cyanobacteria). It has been found possible to usefully chlorinate the water at lower chlorine:MC-LR ratios as compared to known methods and then to irradiate the water with ultraviolet radiation to photolyze the chlorinated MC-LR. The methods incorporate the prechlorination of a cyanotoxin, more advantageously a microcystin, and most advantageously MC-LR, to enhance UV-induced photodegradation of this compound.

15 Claims, 15 Drawing Sheets

(56) References Cited

OTHER PUBLICATIONS

Li and Blatchley, III, "Volatile Disinfection Byproduct Formation Resulting from Clorination of Organic-Nitrogen Precursors in Swimming Pools." Environ. Sci. Technol. 2007, 41, 6732-6739.
Li and Song, "Applicability of the MTT assay for measuring viability of cyanobacteria and algae, specifically for Microcystis aeruginosa (Chroococcales, Cyanobacteria)." Phycologia 2007, 46 (5), 593-599.
Liu et al., "Mechanisms and Reaction Pathways for Microcystin-LR Degradation through UV/H2O2 Treatment." PLoS ONE 2016, 11 (6). E0156236.
Mazur-Marzec et al., "The degradation of the cyanobacterial hepatotoxin nodularin (NOD) by UV radiation." Chemosphere 2006, 65, 1388-1395.
Merel et al., "MS identification of microcystin-LR chlorination by-products." Chemosphere 2009, 74 (6), 832-839.
Merel et al., "State of the art on cyanotoxins in water and their behaviour towards chlorine." Toxicon 2010, 55, 677-691.
Merel et al., "State of knowledge and concerns on cyanobacterial blooms and cyanotoxins." Environ. Intl. 2013, 59, 303-327.
Mitch and Sedlak, "Formation of N-Nitrosodimethylamine (NDMA) from Dimethylamine during Chlorination." Environ. Sci. Technol. 2002, 35, 588-595.
Moe et al., "Climate change, cyanobacteria blooms and ecological status of lakes: A Bayesian network approach." Ecological Modelling 2016, 337, 330-347.
Mosmann T, "Rapid colorimetric assay for cellular growth and survival: application to proliferation and cytotoxicity assays." J. Immunol. Methods 1983, 65 (1), 55-63.
Nicholson et al., "Destruction of Cyanobacterial Peptide Hepatotoxins by Chlorine and Chloramine." Water. Res. 1994, 28 (6), 1297-1303.
Nicholson et al., "Chlorination for degrading saxitoxins (paralytic shellfish poisons) in water." Environ. Technol. 2003, 24 (11), 1341-1348.
Onstad et al., "Selective oxidation of key functional groups in cyanotoxins during drinking water ozonation." Environ. Sci. Technol. 2007, 41 (12), 4397-4404.
Paez-Osuna et al., "Environmental status of the Guld of California: A review of responses to climante change and climate variability." Earth-Sci. Rev. 2016, 162, 253-268.
Pantelic et al., "Cyanotoxins: Characteristics, production and degradation routes in drinking water treatment with reference to the situation in Servia." Chemosphere 2013, 91, 421-441.
Parker and Mitch. "Halogen radicals contribute to photooxidation in coastal and estuarine waters." PNAS 2016, 113 (21), 5868-5873.
Parker et al., "Halogen Radicals Promote the Photodegradation of Microcystins in Estuarine Systems." Environ. Sci. Technol. 2016, 50, 8505-8513.
Pearson et al., "On the chemistry, toxicology and genetics of the cyanobacterial toxins, microcystin, nodularin, saxitoxin and cylindrospermopsin." Marine Drugs 2010, 8 (5), 1650-1680.
Pietsch et al., "Polar Nitrogen Compounds and their Behaviour in the Drinking Water Treatment Process." Wat. Res. 2001, 35 (15), 3537-3544.
Qian et al., "Quantifying and reducing uncertainty in estimated microcystin concentrations from the ELISA method." Environ. Sci. Technol. 2015, 49 (24), 14221-14229.
Qiang and Adams, "Determination of Monochloramine Formation Rate Constants with Stopped-Flow Spectrophotometry." Environ. Sci. Technol. 2004, 38, 1435-1444.
Rodriguez et al., "Kinetics of the oxidation of cylindrospermopsin and anatoxin-a with chlorine, monochloramine and permanganate." Water Res. 2007, 41, 2048-2056.
Rodriguez et al., "Oxidative elimination of cyanotoxins: Comparison of ozone, chlorine, chlorine dioxide and permanganate." Water Res. 2007, 41, 3381-3393.
Rogers and Rapoport, "The pKa's of Saxitoxin." J. Am. Chem. Soc. 1980, 102, 7335-7339.
Scully, Jr. et al., "Disinfection Interference in Wastewaters by Natural Organic Nitrogen Compounds." Environ. Sci. Technol. 1996, 30, 1465-1471.
Senogles et al., "Degradation of the cyanobacterial toxin cylindrospermopsin, from Cylindrospermopsis raciborskii, by chlorination." Toxicon 2000, 38, 1203-1213.
Shang and Blatchley III, "Differentiation and quantification of free chlorine and inorganic chloramines in aqueous solution by MIMS. Environ." Sci. Technol. 1999, 33 (13), 2218-2223.
Sharma et al., "Destruction of microcystins by conventional and advanced oxidation processes: a review." Sep. Purif. Technol. 2012, 91, 3-17.
Shen et al., "(E)-5[2-(Methoxycarbonyl) ethenyl] cytidine as a chemical actinometer for germicidal UV radiation." Environ. Sci. Technol. 2005, 39 (10), 3826-3832.
Sichel et al., "Feasibility studies: UV/chlorine advanced oxidation treatment for the removal of emerging contaminants." Water Res. 2011, 45 (19), 6371-6380.
Song et al., "Hydroxyl radical oxidation of cylindrospermopsin (cyanobacterial toxin) and its role in the photochemical transformation." Environ. Sci. Technol. 2012, 46 (22), 12608-12615.
Song et al., "Radiolysis studies on the destruction of microcystin-LR in aqueous solution by hydroxyl radicals." Environ. Sci. Technol. 2009, 43 (5), 1487-1492.
Song et al., "Ultrasonically induced degradation and detoxification of microcystin-LR (cyanobacterial toxin)." Environ. Sci. Technol. 2005, 39 (16), 6300-6305.
Tsuji et al, "Stability of microcystins from cyanobacteria: Effect of lifght on decomposition and isomerization." Environ. Sci. Technol. 1994, 28, 173-177.
Tsuji et al., "Stability of microcystins from cyanobacteria—II. Effect of UV light on decomposition and isomerization." Toxicon 1995, 33 (12), 1619-1631.
Tsuji et al., "Stability of microcystins from cyanobacteria—IV. Effect of chlorination on decomposition." Toxicon 1997, 35 (7), 1033-1041.
Viaggiu et al., "Anatoxin—A Toxin in the Cyanobacterium Planktothrix Rubescens from a Fishing Pond in Northern Italy." Environ. Toxicol. 2004, 19, 191-197.
Watts and Linden, "Chlorine photolysis and subsequent OH radical production during UV treatment of chlorinated water." Water Res. 2007, 41 (13), 2871-2878.
Welker and Steinberg, "Indirect Photolysis of Cyanotoxins: One Possible Mechanism for their Low Persistence." Wat. Res. 1999, 33 (5), 1159-1164.
Welker and Steinberg, "Rates of Humic Substance Photosensitized Degradation of Microcystin-LR in Natural Waters." Environ. Sci. Technol. 2000, 34, 3415-3419.
Weng and Blatchley III, "Ultraviolet-induced effects on chloramine and cyanogen chloride formation from chlorination of amino acids." Environ. Sci. Technol. 2013, 47 (9), 4269-4276.
Weng et al., "Effects of UV254 irradiation on residual chlorine and DBPs in chlorination of model organic-N precursors in swimming pools." Water Res. 2012, 46 (8), 2674-2682.
Weng et al., "UV-induced effects on chlorination of creatinine." Water Res. 2013, 47 (14), 4948-4956.
Wenk et al., "Effect of Dissolved Organic Matter on the Transformation of Contaminants Induced by Excited Triplet States and the Hydroxyl Radical." Environ. Sci. Technol. 2011, 45, 1334-1340.
Westrick et al., "A review of cyanobacteria and cyanotoxins removal/inactivation in drinking water treatment." Anal. Bioanal. Chem. 2010, 397 (5), 1705-1714.
Wols et al., "Degradation of pharmaceuticals in UV (LP)/H2O2 reactors simulated by means of kinetic modeling and computational fluid dynamics (CFD)." Water Res. 2015, 75, 11-24.
Xiang et al., "Kinetics and pathways of ibuprofen degradation by the UV/chlorine advanced oxidation process." Water Res. 2016, 90, 301-308.
Yang et al., "PPCP degradation by UV/chlorine treatment and its impact on DBP formation potential in real waters." Water Res. 2016, 98, 309-318.

(56) References Cited

OTHER PUBLICATIONS

Zamyadi et al., "Release and Oxidation of Cell-bound Saxitoxins during Chlorination of Anabaena circinalis Cells." Environ. Sci. Technol. 2010, 44, 9055-9061.
Zamyadi et al., "Toxic cyanobacterial breakthrough and accumulation in a drinking water plant: a monitoring and treatment challenge." Water Res. 2012, 46 (5), 1511-1523.
Zegura et al., "Microcystin-LR induced DNA damage in human peripheral blood lymphocytes." Mutation Res. 2011, 726, 116-122.
Zhang et al., "UV/chlorine process for ammonia removal and disinfection by-product reduction: Comparison with chlorination." Water Res. 2015, 68, 804-811.
Zong et al., "Evaluation on the generative mechanism and biological toxicity of microcystin-LR disinfection by-products formed by chlorination." J. Hazard. Mater. 2013, 252, 293-299.
Zong et al., "Oxidation by-products formation of microcystin-LR exposed to UV/H2O2: Toward the generative mechanism and biological toxicity." Water Res. 2013, 47 (9), 3211-3219.
Acero et al., "Kinetics of reactions between chlorine and the cyanobacterial toxins microcystins." Water Res. 2005, 39 (8), 1628-1638.
Abia et al., "Oxidation of Aliphatic Amines by Aqueous Chlorine." Tetrahedron 1998, 54, 521-530.
Antoniou et al., "Cyanotoxins: New Generation of Water Contaminants." J. Environ. Engr. 20005, 131 (9), 1239-1243.
Antoniou et al., "Unveiling new degradation intermediates/pathways from the photocatalytic degradation of microcystin-LR." Environ. Sci. Technol. 2008, 42 (23), 8877-8883.
Azqueta et al., "Comet assay to measure DNA repair: approach and applications." Frontier in Genetics 2014, 5, Article 288.
Banker et al. "Uracil Moiety is Required for Toxicity of the Cyanobacterial Hepatotoxin Cylindrospermopsin." J. Toxicology Environ. Health, Part A 2001, 62 (4), 281-288.
Blatchley III, ER, "Numerical modelling of UV intensity: application to collimated-beam reactors and continuous-flow systems." Water Res. 1997, 31 (9), 2205-2218.
Bogialli et al., "Monitoring algal toxins in lake water by liquid chromatography tandem mass spectrometry." Environ. Sci. Technol. 2006, 40 (9), 2917-2923.
Bullerjahn et al., "Global solutions to regional problems: Collecting global expertise to address the problem of harmful cyanobacterial blooms. A Lake Erie case study." Harmful Algae 2016, 54, 223-238.
Campos and Vasconcelos, "Molecular mechanisms of microcystin toxicity in animal cells." Int. J. Mol. Sci. 2010, 11 (1), 268-287.
Carmichael et al., "Evidence for Paralytic Shellfish Poisons in the Freshwater Cyanobacterium Lyngbya wollei (Farlow ex Gomont) comb. Nov." App. Environ. Microb. 1997, 63 (8), 3104-3110.
Chiswell et al., "Ctability of Cylindrospermopsin, the Toxin from the Cyaobacterium, Cylindrospermopsis raciborskii: Effect of pH, Temperature, and Sunling on Decomposition." Environ. Tocicol. 1999, 14, 155-161.
Choi and Valentine, "Formation of N-nitrosodimethylamine (NDMA) from reaction of monochloramine: a new disinfection by-product" Water Res. 2002, 36, 817-824.
Chong et al., "Study on the cytotoxicity of microcystin-LR on cultured cells." Chemosphere 2000, 41 (1), 143-147.
Clancy et al., "UV light inactivation of Cryptosporidium oosysts." J. AWWA 1998, 90 (9), 92-102.
Craik et al., "Inactivation of Giardia Muris Cysts Using Medium-pressure Ultraviolet Radiation in Filtered Drinking Water." Water Res. 2000, 34 (18), 4325-4332.
Daly et al., "Effect of chlorination on Microcystis aeruginosa cell integrity and subsequent microcystin release and degradation." Environ. Sci. Technol. 2007, 41 (12), 4447-4453.
de Figueiredo et al., "Microcystin-producing blooms—a serious global public health issue." Ecotox. Environ. Safe. 2004, 59 (2), 151-163.
Deborde and von Gunten, "Reactions of chlorine with inorganic and organic compounds during water treatment—Kintetics and mechanisms: A critical review." Water Res. 2008, 42, 13-51.

Dias et al., "Genotoxicity of Microcystin-LR in In Vitro and In Vivo Experimental Models." BioMed Res. Intl. 2014, ID 949521.
Draisci et al., "Identification of anatoxins in blue-green algae food supplements using liquid chromatography-tandem mass spectrometry." Food Additives and Contaminants 2001, 18 (6), 525-531.
Eriksson et al., "Hepatocyte deformation induced by cyanobacterial toxins reflects inhibition of protein phosphatases." Biochem. Biophys. Res. Commun. 1990, 173 (3), 1347-1353.
Fang et al., "The Roles of Reactive Species in Micropollutant Degradation in the UV/Free Chlorine System." Environ. Sci. Technol. 2014, 48, 1859-1868.
Feng et al., "Photolysis of aqueous free chlorine species (HOCl and OCl ) with 254 nm ultraviolet light." J. Environ. Eng. Sci. 2007, 6 (3), 277-284.
Fotiou et al., "Photocatalytic Degradation of Microcystin-LR and Off-Odor Compounds in Water under UV-A and Solar Light with a Nanostructured Photocatalyst Based on Reduced Graphene Oxide-TiO2 Composite. Identification of Intermediate Products." Ind. Eng. Chem. Res. 2013, 52, 13991-14000.
Fotiou et al., "Assessment of the roles of reactive oxygen species in the UV and visible light photocatalytic degradation of cyanotoxins and water taste and odor compounds using C-TiO2." Water Res. 2016, 90, 52-61.
Fox et al., "Chloramines VII: Chlorination of Alanylphenylalanine in Model Solutions and in a Wastewater." Environ. Sci. Technol. 1997, 37, 1979-1984.
Gould et al., "The Kinetics and Primary Products of Uracil Chlorination." Water Res. 1984, 18 (2), 205-212.
Halme et al., "Verification and quantification of saxitoxin from algal samples using fast and validated hydrophilic interaction liquid chromatography-tandem mass spectrometry method." J Chromatography B 2012, 880, 50-57.
He et al., "Degradation mechanism of cyanobacterial toxin cylindrospermopsin by hydroxyl radicals in homogeneous UV/H2O2 process." Environ. Sci. Technol. 2014, 48 (8), 4495-4504.
He et al., "Destruction of microcystins (cyanotoxins) by UV254 nm-based direct photolysis and advanced oxidation processes (AOPs): Influence of variable amino acids on the degradation kinetics and reaction mechanisms." Water Res. 2015, 74, 227-238.
He et al., "Efficient removal of microcystin-LR by UV-C/H2O2 in synthetic and natural water samples." Water Res. 2012, 46 (5), 1501-1510.
Heisler et al., "Eutrophication and harmful algal blooms: A scientific consensus." Harmful Algae 2008, 8, 3-13.
Hijnen et al., "Inactivation credit of UV radiation for viruses, bacteria and protozoan (oo) cysts in water: a review." Water Res. 2006, 40 (1), 3-22.
Ho et al., "Bacterial degradation of microcystin toxins in drinking water eliminates their toxicity." Toxicon 2007, 50 (3), 438-441.
Ho et al., "Differences in the chlorine reactivity of four microcystin analogues." Water Res. 2006, 40 (6), 1200-1209.
Hooser SB, "Fulminant hepatocyte apoptosis in vivo following microcystin-LR administration to rats." Toxicol. Pathol. 2000, 28 (5), 726-733.
Huber et al., "Oxidation of Pharmaceuticals during Ozonation and Advanced Oxidation Processes." Environ. Sci. Technol. 2003, 37, 1016-1024.
Jasionek et al., "Mitochondrial toxicity of microcystin-LR on cultured cells: application to the analysis of contaminated water samples." Environ. Sci. Technol. 2010, 44 (7), 2535-2541.
Jensen and Johnson, "Specificity of the DPD and amperometric titration methods for free available chlorine: A review." J.Am. Water Works Ass. 1989, 81 (12), 59-64.
Jensen and Johnson, "Interferences by Monochloramine and Organic Chloramines in Free Available Chlorine Methods. 2. N,N-Diethyl-p-phenylenediamine." Environ. Sci. Technol. 1990, 24, 985-990.
Jiang et al., "Oxidation of microcystin-LR by ferrate (VI): kinetics, degradation pathways, and toxicity assessments." Environ. Sci. Technol. 2014, 48 (20), 12164-12172.
Jin et al., "Assessment of the UV/Chlorine process as an advanced oxidation process." Water Res. 2011, 45 (4), 1890-1896.
Kaminski et al., "Determination of anatoxin—a stability under certain abiotic factors." Harmful Algae 2013, 28, 83-87.

(56) References Cited

OTHER PUBLICATIONS

Keefe et al., "Chloramines VI: Chlorinatio of Glycylphenylalanine in Model Solutions and in a Wastewater." Environ. Sci. Technol. 1997, 37, 1973-1978.

Kinnear S., "Cylindrospermopsin: A Decade of Progress on Bioaccumulation Research." Marine Drugs 2010, 8, 542-564.

Laat et al., "Effect of dissolved oxygen on the photodecomposition of monochloramine and dichloramine in aqueous solution by UV irradiation at 253.7 nm." Water Res. 2010, 44, 3261-3269.

Lawton et al., "Detoxification of Microcystins (Cyanobacterial Hepatotoxins) Using TiO2 Photocatalytic Oxidation." Environ. Sci. Technol. 1999, 33, 771-775.

Laycock et al., "Laboratory desalination experiments with some algal toxins." Desalination 2012, 293, 1-6.

Lee et al., "Organic Contaminant Abatement in Reclaimed Water by UV/H2O2 and a Combined Process Consisting of O3/H2O2 Followed by UV/H2O2: predicition of Abatement Efficiency, Energy Consumption, and Byproduct Formation." Environ. Sci. Technol. 2016, 50, 3809-3819.

\* cited by examiner

"CHLORINATION-UV PROCESS FOR DECOMPOSITION AND DETOXIFICATION OF MICROCYSTIN-LR

CROSS-REFERENCE TO RELATED APPLICATION

This application claims priority to U.S. provisional application entitled "CHLORINATION-UV PROCESS FOR DECOMPOSITION AND DETOXIFICATION OF MICROCYSTIN-LR" having Ser. No. 62/379,809, filed on Aug. 26, 2016, which is entirely incorporated herein by reference.

TECHNICAL FIELD

The present disclosure is generally related to a method of photolytically decomposing a microcystin contamination of an aqueous liquid.

BACKGROUND

Harmful Algal Blooms (HABs) are attributable to rapid, localized growth of "algae" and other species, most of which are photosynthetic. There is evidence to indicate that HABs are occurring with increasing frequency, probably because of the combined effects of a number of factors, including changes in nutrient addition, introduction or seeding of non-indigenous species, and climate change (e.g., Heisler et al., (2008) *Harmful Algae*. 8: 3-13 (2016). The cyanobacteria that are responsible for HAB events generate metabolic products called cyanotoxins that express toxicity, usually toward digestive organs (e.g., liver, kidney) or the central nervous system.

Microcystin (MC) contamination has become a worldwide concern because of the increased occurrence of cyanobacteria blooms in surface waters that are used for drinking water supplies (Bogialli et al., (2006) *Environ. Sci. Technol.* 40: 2917-2923; Westrick et al., (2010) *Anal. Bioanal. Chem.* 397: 1705-1714; Zamyadi et al., (2012) *Water Res.* 46: 1511-1523). MCs are potent hepatotoxins that comprise a group of cyclic heptapeptides containing a relatively large amino acid moiety (Adda) and two variable amino acid moieties (He et al., (2012) *Water Res.* 46: 1501-1510). One of the most widespread and toxic MCs is microcystin-LR (MC-LR), the variable amino acids of which are leucine and arginine, accounting for 46.0%-99.8% of the total MCs in cyanobacterial blooms (Zong et al., (2013) *J. Hazard. Mater.* 252, 293-299; Sharma et al., (2012) *Sep. Purif. Technol.* 91, 3-17).

MC-LR has been shown to induce chronic or acute liver injury by inhibiting activity of protein phosphatases 1 and 2A (Campos et al., (2010) *Int. J. Mol. Sci.* 11: 268-287; Herfindal & Selheim (2006) *Med Chem.* 6: 279-285). MC-LR has also been identified as a tumor initiator and promoter in human liver and colorectal cells (Eriksson et al., (1990) *Biochem. Biophys. Res. Commun.* 173: 1347-1353; Hooser, S. B., (2000) *Toxicol. Pathol.* 28: 726-733). The World Health Organization has proposed a provisional guideline concentration of 1.0 µg/L for MC-LR (free plus cell-bound) in drinking water (*Guidelines for drinking-water quality: recommendations*. World Health Organization: (2004) Vol. 1).

Previous studies have indicated that chlorination can be applied for MC degradation (Tsuji et al., (1997) *Toxicon* 35: 1033-1041). The apparent second-order rate constant for chlorination of MC-LR at 20:1 chlorine:MC-LR molar ratio and 20° C. has been reported as 127.8 $M^{-1}$ $s^{-1}$ at pH 6.1, 91.5 $M^{-1}$ $s^{-1}$ at pH 7, and 33.1 $M^{-1}$ $s^{-1}$ at pH 8 (Acero et al., (2005) *Water Res.* 39: 1628-1638). These observations suggested that hypochlorous acid is the main active species in MC-LR chlorination. However, high chlorine doses and long contact times are required in this process, leading to the formation of suspected carcinogenic byproducts (Zong et al., (2013) *J. Hazard. Mater.* 252, 293-299).

It also has been reported that MC-LR undergoes photolysis upon exposure to germicidal ultraviolet (UV) radiation (Tsuji et al., (1995) *Toxicon* 33: 1619-1631). However, UV doses required for MC-LR photodecomposition range from 1,530 $mJ/cm^2$ to 20,000 $mJ/cm^2$, roughly 1-3 orders of magnitude greater than those required for disinfection (Hijnen et al., (2006) *Water Res.* 40: 3-22).

A high-profile example of MC-LR contamination occurred in Toledo (OH, U.S.) in 2014. The Toledo water supply was shut down for several days because the MC concentration in their finished water supply was unacceptably high. It should be noted that the Toledo water supply is disinfected using chlorine. However, chlorination was not able to reduce the MC concentration to a point that conformed to WHO Guidelines. Therefore, an ongoing need exists to develop more effective processes for MC control.

Advanced oxidation processes (AOPs) have been investigated for degradation of MC-LR by hydroxyl radicals. For perspective, the rate constant for the reaction between hydroxyl radicals and MC-LR has been reported to be 2.3 ($\pm 0.1$)$\times 10^{10}$ $M^{-1}$ $s^{-1}$ (Song et al., (2009) *Environ. Sci. Technol.* 43: 1487-1492). This reaction is sufficiently fast that it may be considered to be a diffusion-controlled process. The combined application of chlorination and UV irradiation is often described as an AOP, involving the generation of oxidizing radicals (Sichel et al., (2011) *Water Res.* 45: 6371-6380; Watts & Linden (2007) *Water Res.* 41: 2871-2878). However, no information is available to describe the effects of combined chlorine/UV process for MC-LR decomposition.

This conventional view of the chlorine/UV process as an AOP has focused on photolysis of free chorine to yield a hydroxyl radical and a chlorine free radical (Feng et al., (2007) *J. Environ. Eng. Sci.* 6: 277-284). These radicals can contribute to decomposition of target compounds. However, another pathway may exist whereby chlorine and UV radiation may act synergistically to degrade target compounds. It has been demonstrated that chlorination of amines will activate these compounds toward UV photodegradation (Zhang et al., (2015) *Water Res.* 68, 804-811; Li & Blatchley III, (2009) *Environ. Sci. Technol.* 43: 60-65; Weng & Blatchley III (2013) *Environ. Sci. Technol.* 47: 4269-4276; Weng et al., (2012) *Water Res.* 46: 2674-2682). Chlorinated amines generally have higher molar absorptivity ($\varepsilon_{254}$) and quantum yield ($\Phi_{254}$) than their respective unchlorinated parent compounds. As an example, $\varepsilon_{254}$ and $\Phi_{254}$ for photodegradation of creatinine have been reported to be 1293 $M^{-1} \cdot cm^{-1}$ and 0.011±0.002 mol/E, respectively, whereas corresponding values of N-chloro-creatinine increased to 3911 $M^{-1} \cdot cm^{-1}$ and 0.144±0.011 mol/E (Weng et al., (2013) *Water Res.* 47: 4948-4956).

SUMMARY

Briefly described, one aspect of the disclosure encompasses embodiments of a method for reducing the concentration of a cyanotoxin in an aqueous liquid, the method comprising the sequential steps of: (a) adding a halogen to an aqueous liquid having a cyanotoxin contamination and (b) irradiating the aqueous liquid with ultraviolet radiation having a wavelength of between about 200 nm to about 400 nm.

In some embodiments of this aspect of the disclosure the cyanotoxin can be selected from the group consisting of a microcystin, a nodularin, an anatoxin, a cylindrospermopsin, a lyngbyatoxin, a saxitoxin, and a β-methylamino-L-alanine.

In some embodiments of this aspect of the disclosure, the cyanotoxin can be microcystin-LR.

In some embodiments of this aspect of the disclosure the method can further comprise before step (a) the step of adjusting the pH of the aqueous liquid to have a pH value greater than 7.0.

In some embodiments of this aspect of the disclosure the halogen can be chlorine.

In some embodiments of this aspect of the disclosure, the ultraviolet radiation can have a wavelength of between about 200 nm to about 280 nm In some embodiments of this aspect of the disclosure, the ultraviolet radiation can have a wavelength of about 254 nm.

In some embodiments of this aspect of the disclosure the aqueous liquid is a potable water supply.

In some embodiments of this aspect of the disclosure the molar ratio of chlorine to the microcystin-LR can be at least about 1:1 to about 10:1.

In some embodiments of this aspect of the disclosure the pH of the aqueous liquid can be adjusted to a value between about 7.3 to about 9.5.

In some embodiments of this aspect of the disclosure the pH of the aqueous liquid can be adjusted to a value of about 8.5.

In some embodiments of this aspect of the disclosure the aqueous liquid can be irradiated with ultraviolet radiation at a dose of between about 300 mJ/cm$^2$ to about 1000 mJ/cm$^2$.

In some embodiments of this aspect of the disclosure the aqueous liquid can be irradiated with ultraviolet radiation at a dose of between about 300 mJ/cm$^2$ to about 900 mJ/cm$^2$.

In some embodiments of this aspect of the disclosure the aqueous liquid can be irradiated with ultraviolet radiation at a dose of between about 700 mJ/cm$^2$ to about 800 mJ/cm$^2$.

Another aspect of the disclosure encompasses embodiments of a method for reducing the concentration of microcystin-LR (MC-LR) in water, said method comprising the sequential steps of: (a) adjusting the pH of the water to have a pH value between about 7.5 to about 9.0; (b) adding chlorine to the water to a molar ratio of chlorine to the microcystin-LR of at least about 1:1 to about 5:1; and (c) irradiating the water with ultraviolet radiation having a wavelength of between about 200 nm to about 400 nm at an dose of between about 300 mJ/cm$^2$ to about 900 mJ/cm$^2$.

In some embodiments of this aspect of the disclosure the ultraviolet radiation can have a wavelength of between about 200 nm to about 280 nm In some embodiments of this aspect of the disclosure the pH of the aqueous liquid can be adjusted to a value of about 8.5, the molar ratio of chlorine to the microcystin-LR is at least about 1:1, the ultraviolet radiation has a wavelength of between about 254 nm, and the aqueous liquid is irradiated with ultraviolet radiation at a dose of between about 300 mJ/cm$^2$ to about 800 mJ/cm$^2$.

It should be emphasized that the embodiments of the present disclosure, particularly any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 9A: MC-LR untreated, MC-LR irradiated with 180 mJ/cm$^2$, and MC-LR irradiated with 540 mJ/cm$^2$; FIG. 9B: Chlorine (CH):MC-LR (1:1) untreated, Chlorine (CH):MC-LR (1:1) irradiated with 180 mJ/cm$^2$, and Chlorine (CH):MC-LR (1:1) irradiated with 540 mJ/cm$^2$; FIG. 9C: Chlorine (CH):MC-LR (2:1) untreated, Chlorine (CH):MC-LR (2:1) irradiated with 180 mJ/cm², and Chlorine (CH):MC-LR (2:1) irradiated with 540 mJ/cm²; FIG. 9D: Chlorine (CH):MC-LR (5:1) untreated, Chlorine (CH):MC-LR (5:1) irradiated with 180 mJ/cm², and Chlorine (CH):MC-LR (5:1) irradiated with 540 mJ/cm². Collectively, these data indicate poor separation of the parent compound and its products by the LC method used in this investigation, probably because the mobile phase flow rate (1.0 mL/min) used for these analyses and the relatively small changes in the overall structure of the molecule that resulted from chlorination.

DETAILED DESCRIPTION

Figure 1:
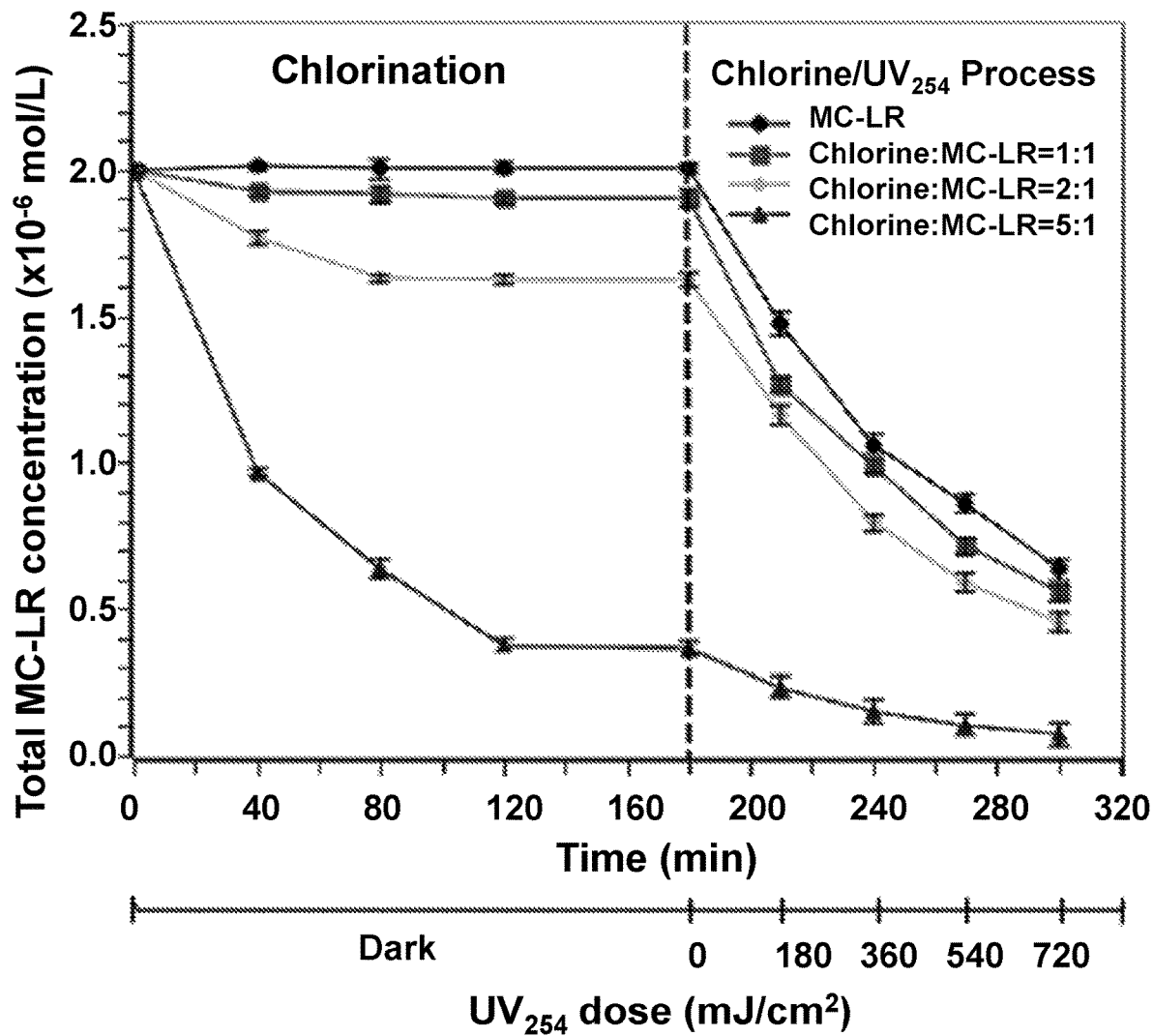
FIG. 1 is a graph illustrating a time-course for Total MC-LR decomposition resulting from chlorination, UV$_{254}$ irradiation, and the chlorine/UV process. UV$_{254}$ irradiation started at the time indicated by the vertical, dashed line. ([MC-LR]$_0$=2.00×10$^{-6}$ mol/L; pH of initial MC-LR solution=7.78).

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein.

Prior to describing the various embodiments, the following definitions are provided and should be used unless otherwise indicated.

Abbreviations

MC, microcystin; MC-LR, microcystin-LR (microcystin-leucine-arginine); Adda, 3-amino-9-methoxy-2,6,8-trimethyl-10-phenyldeca-4,6-dienoic acid Definitions The term "cyanotoxins" as used herein refers to: (a) microcystins (MCs): Cyclic heptapeptides that are potent hepatoxins, comprise a group of more than 90 congeners that share several common amino acid groups and two variable amino acids. Typical molecular weights of the MCs are roughly 1000 Daltons. Their cyclic structure and the presence of peptide bonds contribute to their stability in the environment and their recalcitrance toward water treatment processes. Binding of MCs to liver cells involves (2S,3S,4E,6E,8S,9S)-3-amino-9-methoxy-2,6,8-trimethyl-10-phenyldeca-4,6-dienoic acid (Adda), a non-proteinogenic amino acid; (b) Nodularins (NODs): NODs are smaller than MCs (MW approximately 800 Daltons), but otherwise share many characteristics of MCs. They also depend on Adda for binding to host cells; as such, processes that have the ability to damage Adda may also lead to detoxification of NODs; (c) Anatoxin-a (ANTX-a): ANTX is a secondary, bicyclic, amine alkaloid (MW=165 Daltons). ANTX-a is a potent neurotoxin and sometimes referred to as "Very Fast Death Factor" (VFDF). Because of acid/base behavior associated with the amine moiety, its stability in the environment is strongly influenced by pH. It is likely that the responses of ANTX-a to water treatment will also display pH-dependence; (d) Cylindrospermopsin (CYN): CYN is a polycyclic uracil derivative (MW=415 Daltons) that also contains a guanidine group. Toxicity of CYN is strongly dependent on the uracil group; as such, treatment processes that have the ability to alter the uracil structure also have the potential to alter CYN toxicity (Banker et al., 2001). The zwitterion character of CYN contributes to its hydrophilicity and the changes in stability of the molecule that result from changes in pH; and (e) Saxitoxins (STXs); STXs are often associated with paralytic shellfish poisoning, a disease that can result from consumption of contaminated clams, mussels, or other filter feeders. STXs are alkaloids that are based on a 3,4,6-trialkyl tetrahydropurine skeleton. Included in this group is the compound STX (MW=299 Daltons). STX contains a guanidinium group as well as terminal amine groups. The STX molecule displays acid/base behavior that influences its pH-dependent stability in water.

The term "microcystin" (or cyanoginosins) are a class of toxins produced by certain freshwater cyanobacteria, primarily *Microcystis aeruginosa* but also other *Microcystis*, as well as members of the *Planktothrix, Anabaena, Oscillatoria* and *Nostoc* genera. Over 50 different microcystins have been discovered so far, of which microcystin-LR is the most common. They are cyclic heptapeptides produced through non-ribosomal peptide synthases. Microcystins can be produced in large quantities during algal blooms and pose a major threat to drinking and irrigation water supplies, as well as the environment at large. Microcystin-LR is the most toxic form of over 80 known toxic variants. Microcystin-containing 'blooms' are a problem worldwide, including China, Brazil, Australia, South Africa the United States and much of Europe.

Microcystins contain several uncommon non-proteinogenic amino acids such as dehydroalanine derivatives and the uncommon β-amino acid Adda (3-amino-9-methoxy-2,6,8-trimethyl-10-phenyldeca-4,6-dienoic acid). Microcystins covalently bond to and inhibit protein phosphatases PP1 and PP2A and can thus cause pansteatitis (inflammation of body fat).

Figure 7:
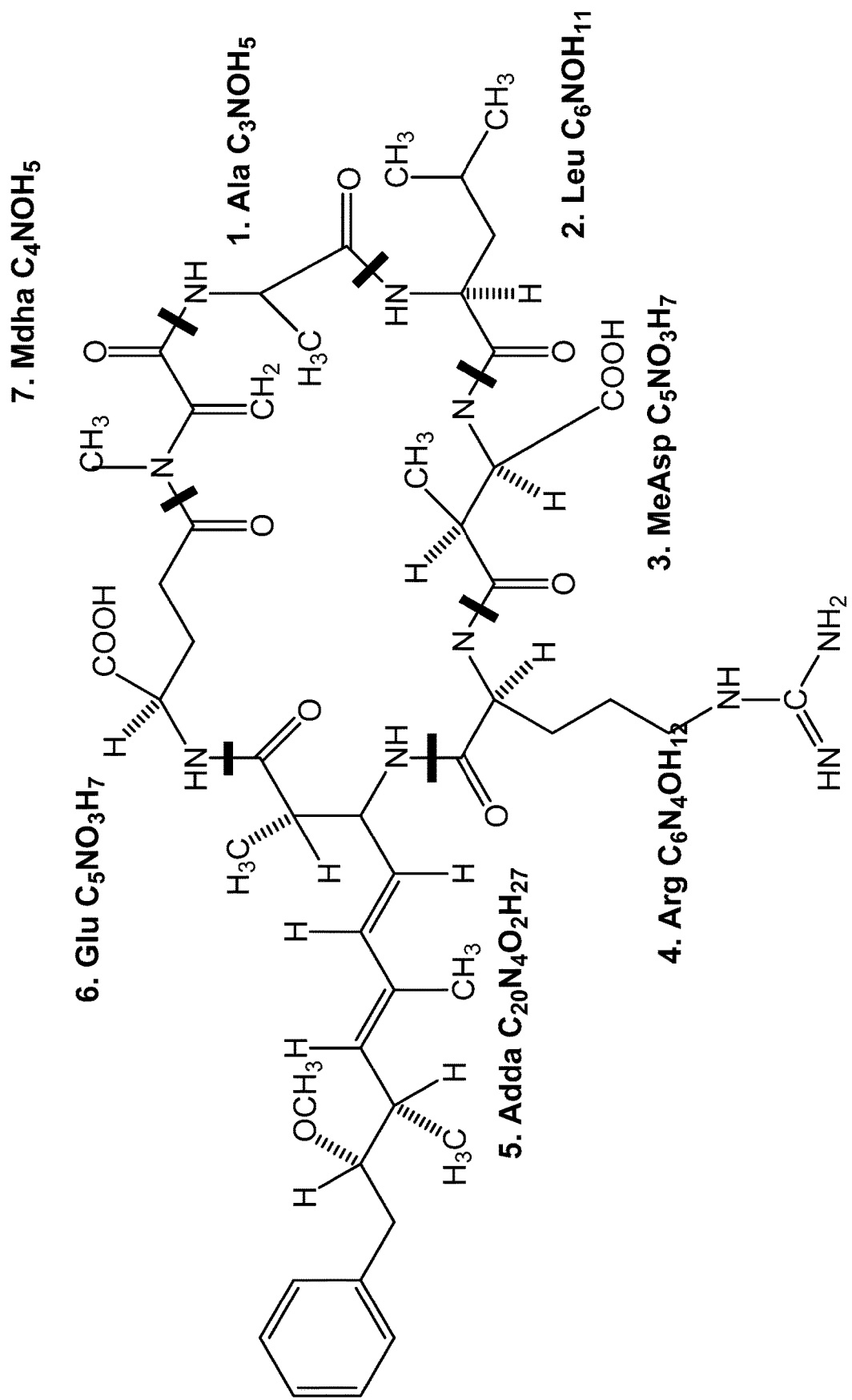
FIG. 7 illustrates the structure of microcystin-LR. MCs are cyclic heptapeptides that share a general structure of seven amino acids joined through peptide bonds. The variable amino acids in microcystin-LR are Leucine (site 2) and arginine (site 4).

The term "microcystin-LR" (alternatively "MC-LR" and "5-L-Arginine-microcystin LA") as used herein refers to the structure having the IUPAC name 5R,8S,11R,12S,15S,18S,19S,22R)-15-[3-(diaminomethylideneamino)propyl]-18-[(1E,3E,5S,6S)-6-Methoxy-3,5-dimethyl-7-phenylhepta-1,3-dienyl]-1,5,12,19-tetramethyl-2-methylidene-8-(2-methylpropyl)-3,6,9,13,16,20,25-heptaoxo-1,4,7,10,14,17,21-heptazacyclopentacosane-11,22-dicarboxylic acid, as shown in FIG. 7. Other variants of microcystin include, but are not limited to, MC-LA (MC-Leucine-Alanine); MC-RR (MC-Arginine-Arginine); and MC-YR, (MC-Tyrosine-Arginine).

The term "Adda" as used herein refers to (all-S,all-E)-3-Amino-9-methoxy-2,6,8-trimethyl-10-phenyldeca-4,6-dienoic acid, a non-proteinogenic amino acid found in toxins made by cyanobacteria. Toxins that include this amino acid are microcystin and nodularin.

The term "aqueous liquid" as used herein refers to any aqueous-based liquid having an amount of microcystin. In particular, the method of the disclosure is most advantageously applied to a volume of water such as a potable water supply that has been contaminated with microcystin. Most advantageously the aqueous liquid has a content of organic material at a level that does not reduce the amount of chlorine that may effectively chlorinate the MC-LR. Further, the aqueous liquid does not reduce the intensity of the irradiating ultraviolet radiation to a level that does not result in a reduction in the amount of MC in the aqueous liquid.

The term "method comprising the sequential steps" as used herein refers to a procedure with the defined order of adding chlorine to the aqueous liquid to be decontaminated of MC-LR and then irradiating the liquid with ultraviolet radiation. Optionally, the pH of the liquid made be elevated before the addition of the chlorine.

The term "ultraviolet radiation" as used herein refers to electromagnetic radiation having a wavelength of between about 200 nm to about 400 nm, advantageously between about 200 nm to about 280 nm (alternatively termed "UVC radiation"), more advantageously about 250 nm, and most advantageously about 254 nm.

Numerical ranges recited herein by endpoints include all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about." The term "about" means plus or minus 0.1 to 50%, 5-50%, or 10-40%, advantageously 10-20%, more advantageously 10% or 15%, of the number to which reference is being made. Further, it is to be understood that "a", "an," and "the" include plural referents unless the content clearly dictates otherwise. Thus, for example, reference to a composition comprising "a compound" includes a mixture of two or more compounds.

Description

The methods of the present disclosure incorporate the prechlorination of a cyanotoxin, more advantageously a microcystin, and most advantageously MC-LR, to enhance UV-induced photodegradation of this compound by a process that is analogous to those previously observed with ammonia (Li & Blatchley III, (2009) *Environ. Sci. Technol.* 43: 60-65), amino acids (Weng & Blatchley III (2013) *Environ. Sci. Technol.* 47: 4269-4276; Weng et al., (2012) *Water Res.* 46: 2674-2682) and creatinine (Weng et al., (2013) *Water Res.* 47: 4948-4956). To test this step-wise, ordered, method of destroying MC-LR, the effectiveness of the chlorine/UV process for MC-LR treatment was elucidated both in terms of decomposition and detoxification at relatively low chlorine doses (chlorine:MC-LR molar ratio of 5:1 or less). The effects of the chlorine:MC-LR molar ratio, $UV_{254}$ dose, and pH on MC-LR decomposition were examined. The byproducts of MC-LR decay by the chlorine/$UV_{254}$ process were subsequently identified. The toxicity of MC-LR and its corresponding decomposition products were also assessed over this range of reaction conditions using a common human liver cancer cell line.

Both the efficiency of decomposition and detoxification of MC-LR by the chlorine/UV process were compared with the results of treatment by chlorination and UV irradiation individually. It is further intended that the ordered method of the disclosure, while most usefully applicable to the photolytic destruction of MC-LR, can be generally applied for the destruction of other types of microcystin or cyanotoxins in general that have bonds or groups that may be halogenated (advantageously, but not limited to, chlorinated) thereby rendering the microcystin or cyanotoxin more labile when subjected to ultraviolet radiation compared to not pretreating with a halogen.

Microcystin-LR (MC-LR) is a potent hepatotoxin that is often associated with blooms of cyanobacteria. Previous research has indicated that chlorination and UV irradiation can both bring about degradation of MC-LR; however, no information is available to describe the effects of the combined chlorine/$UV_{254}$ process for this purpose. Therefore, experiments were conducted to evaluate the efficiency of the chlorine/UV process for MC-LR decomposition and detoxification at a low chlorine:MC-LR molar ratio (5:1 or less). Results of these experiments indicated that chlorinated MC-LR is more photoactive than MC-LR.

Photodecomposition of MC-LR and chlorinated MC-LR was observed to follow pseudo first-order kinetics. The effective photodecay constant increased monotonically from $1.46 \times 10^{-4}$ s$^{-1}$ for MC-LR to $2.23 \times 10^{-4}$ s$^{-1}$ for chlorinated MC-LR at a chlorine:MC-LR molar ratio of 5:1 (initial pH 7.78). LC/MS analyses confirmed that the arginine moiety represented an important reaction site within the MC-LR molecule for conditions of chlorination below the chlorine demand of the molecule. The pre-chlorination step activated MC-LR toward $UV_{254}$ exposure by increasing the product of molar absorptivity and quantum yield of chloro-MC-LR relative to the unchlorinated molecule. This mechanism of decay is fundamentally different than the conventional view of chlorine/UV as an advanced oxidation process where photolysis of hypochlorous acid (HOCl) is used to generate hydroxyl and chlorine radicals, which in turn may react with target molecules. A toxicity assay based on human liver cells indicated MC-LR degradation by-products in the chlorine/UV process possessed less cytotoxicity than those that resulted from chlorination or $UV_{254}$ irradiation applied separately. MC-LR decomposition and detoxification in this combined process were more effective at pH 8.5 than at pH 7.5 or 6.5. These results suggest that the chlorine/UV process represents an advantageous strategy for control of microcystins and their associated toxicity in drinking water supplies.

The present disclosure, therefore, encompasses embodiments of an ordered step-wise method for the chlorination and photodestruction of MC-LR contamination of an aqueous liquid such as a potable water supply infested with blue-green algae (cyanobacteria). It is contemplated that the water to be treated by the methods of the disclosure may be a chlorine-treated potable water supply. Most typically, such as supply will have a level of chlorine in excess of that required for the destruction of the cyanotoxins by the methods of the disclosure. Thus, such chlorine-treated water may then have a pH adjusted, if necessary, to a level greater than about 7.3, but advantageously not exceeding about 9.5. It is contemplated, however, if the source of the water containing the cyanotoxins has not been pre-treated with chlorine, this step is first carried out and the pH is adjusted as above before exposure of the water to ultra-violet light irradiation. It has further been found possible to usefully chlorinate the water at lower chlorine:MC-LR ratios as compared to known methods and then to irradiate the water with ultraviolet radiation to photolyze the chlorinated MC-LR.

Use of the reduced levels of chlorine relative to the amount of the MC-LR and prior to the irradiation step can result in more efficient destruction of the MC-LR and significantly reduced levels of undesirable cytotoxic by-products. It has further found to be advantageous, besides the ordering of the steps of the method, to adjust the pH of the aqueous liquid to a value that is greater than about 7.0. Preferably, pH adjustment is carried out before the halogenation step. Once the ultraviolet irradiation step has been completed, it is contemplated that the pH of the liquid may be returned to a value of about 7.0, maintained at a value greater than about 7.3 that is suitable for such as corrosion protection of distribution pipes, tanks, and the like, or reduced.

The Chlorine/UV Process for MC-LR Decomposition:

Merel et al. (2009) indicated a chlorine demand of 12:1 (on a molar basis) for MC-LR. Previous investigations of chlorination of MC-LR were conducted under a pseudo-first-order condition in which initial chlorine (molar) concentrations were at least 20× in excess of MC-LR (Acero et al., (2005) *Water Res.* 39: 1628-1638; Merel et al., (2009) *Chemosphere* 74: 832-839). To avoid interference of residual free chlorine photolysis in the investigation of MC-LR decomposition by the chlorine/UV process, the initial free chlorine concentration applied in this study was less than the chlorine demand of MC-LR. The free chlorine: MC-LR molar ratios used in these initial experiments were 0:1, 1:1, 2:1, and 5:1. The concentration of residual free chlorine in the samples after 180 min chlorination was below the detection limit ($0.1 \times 10^{-6}$ mol/L as $Cl_2$), thereby confirming the complete consumption of free chlorine by MC-LR in chlorination period.

FIG. 9 shows a single chromatographic peak corresponding to MC-LR and some of the reaction products that resulted from chlorination or the chlorine/UV process. Collectively, these data indicate poor separation of the parent compound and its products by the LC method used in this investigation, probably because the mobile phase flow rate (1.0 mL/min) used for these analyses and the relatively small changes in the overall structure of the molecule that resulted from chlorination. No product separation was observed, probably because of the mobile phase flow rate (1.0 mL/min) and the relatively small changes in the overall structure of the molecule. Based on the poor separation of MC-LR and its products, "Total MC-LR" was used to express the mixtures of MC-LR and its byproducts.

FIG. 1 illustrates the time-course of decomposition of Total MC-LR resulting from chlorination, $UV_{254}$ irradiation, and the combined chlorine/UV process. The initial pH of the MC-LR solution was 7.78. As illustrated in FIG. 1, the concentration of MC-LR (curve labeled "MC-LR") remained essentially constant at the initial concentration of $2.00 \times 10^{-6}$ mol/L (2.00 mg/L) in the absence of either free chlorine or $UV_{254}$ irradiation.

The extent of MC-LR decomposition was strongly dependent on the initial chlorine dose. Although the chlorine:MC-LR molar ratio used in this study was less than those used in previous studies, the disappearance curves of MC-LR reported herein were consistent with earlier work. After 180 min chlorination, measured decomposition of Total MC-LR was 5%, 17%, and 80% at chlorine:MC-LR molar ratios of 1:1, 2:1 and 5:1, respectively.

Acero et al. (2005) demonstrated that the chlorination of MC-LR followed second-order kinetics, first-order in MC-LR and first-order in oxidant (HOCl+OCl$^-$) (Acero et al., (2005) *Water Res.* 39: 1628-1638). In this study, the apparent second-order rate constant for chlorination of MC-LR was 44.5 $M^{-1}$ $s^{-1}$ at pH 7.78.

In the chlorine/UV process, MC-LR and its chlorination products underwent photolytic degradation by $UV_{254}$ irradiation for doses ranging from 0 to 720 $mJ/cm^2$, both with and without pre-chlorination. As shown in FIG. 1, the degradation of MC-LR followed pseudo first-order kinetics, which was consistent with a pure photolytic process for a dilute solution or any other AOP treatment (Tsuji et al., (1995) *Toxicon* 33: 1619-1631). The photodecay constants of MC-LR were $1.46 \times 10^{-4}$ $s^{-1}$ ($R^2$=0.996), $1.69 \times 10^{-4}$ $s^{-1}$ ($R^2$=0.993), $1.79 \times 10^{-4}$ $s^{-1}$ ($R^2$=0.995), and $2.23 \times 10^{-4}$ $s^{-1}$ ($R^2$=0.992) for chlorine: MC-LR molar ratios of 0:1, 1:1, 2:1, and 5:1, respectively. The rate of MC-LR degradation increased monotonically with chlorine:MC-LR molar ratio and was not dependent on the initial MC-LR (and its chlorination products) concentration. These results indicate that chlorinated MC-LR was more photoactive than parent MC-LR.

Consumption of Chlorine:

The consumption of chlorine by MC-LR was determined at chlorine:MC-LR molar ratio of 2:1 (initial MC-LR concentration of $5.00 \times 10^{-6}$ mol/L, and chlorine dose of $10.00 \times 10^{-6}$ mol/L) for 180 min chlorination of MC-LR in the dark. The residual free chlorine concentration after chlorination was below the limit of detection ($0.1 \times 10^{-6}$ mol/L), implying the reaction was completed and free chlorine was entirely consumed at 2:1 of chlorine:MC-LR molar ratio.

The total chlorine signal from the DPD/KI method represents the sum of free chlorine and combined chlorine. The total chlorine signal after 180 min indicated a concentration of $3.30 \times 10^{-6}$ mol/L, implying that chlorination of MC-LR induced the formation of combined chlorine. It is likely that the combined chlorine signal was largely attributable to N-chloro MC-LR; like other organic chloramines, this compound will contribute to the DPD/KI signal (Jensen & Johnson (1989) *J. Am. Water Works Ass.* 59-64; Shang & Blatchley III, (1999) *Environ. Sci. Technol.* 33: 2218-2223; Weaver et al., (2009) *Water Res.* 43: 3308-3318). In considering these total residual chlorine results, and taking into account the presence of amine groups and conjugated double bonds in the MC-LR molecule, it can be inferred that addition and/or substitution reactions were involved in the reactions of chlorine with MC-LR.

Furthermore, the total chlorine concentration decreased from $3.30 \times 10^{-6}$ mol/L in chlorination to $1.76 \times 10^{-6}$ mol/L after subsequent exposure to a $UV_{254}$ dose of 720 $mJ/cm^2$. Therefore, roughly 53% of residual (combined) chlorine underwent photodecay, thereby supporting the assumption that $UV_{254}$ irradiation induces the photolysis of N-chloro MC-LR (organic chloramines).

Figure 2A:
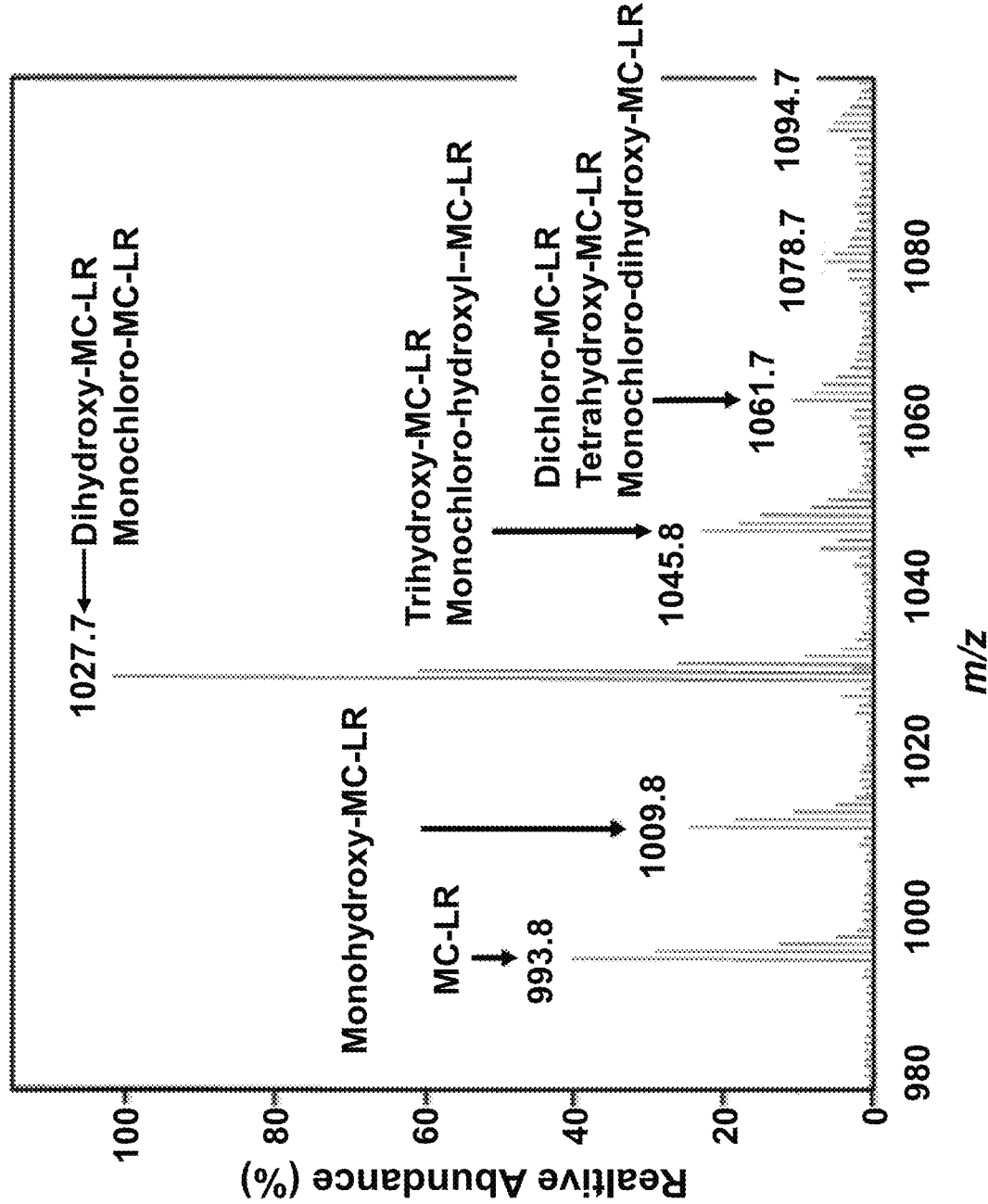
FIG. 2A illustrates a mass spectrum of MC-LR by-products resulting from chlorination alone. ([MC-LR]$_0$=5.00×10$^{-6}$ mol/L; chlorine:MC-LR molar ratio=2:1; chlorination time=180 min.
Figure 2B:
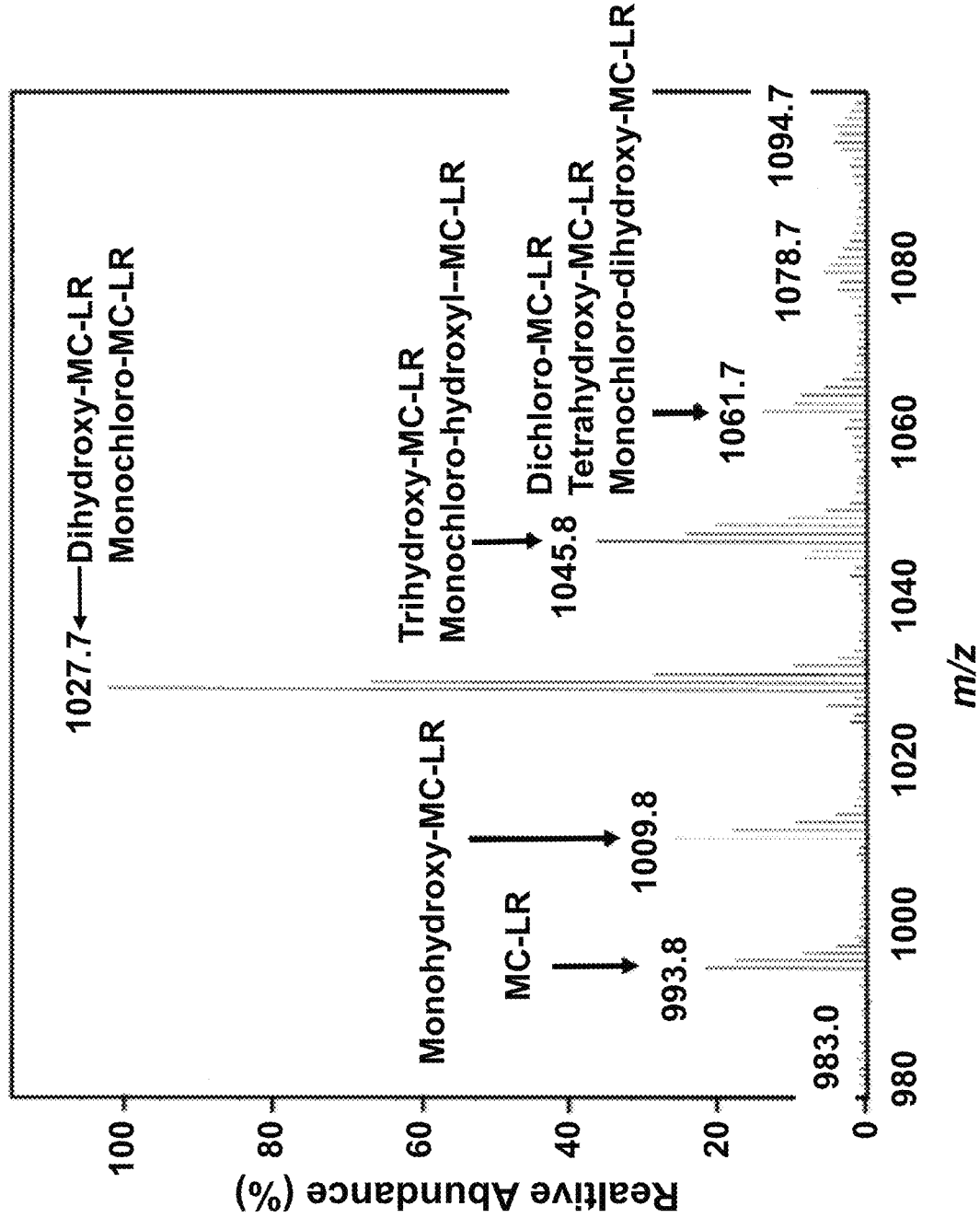
FIG. 2B illustrates a mass spectrum of MC-LR by-products resulting from chlorine/UV$_{254}$ process. ([MC-LR]$_0$=5.00×10$^{-6}$ mol/L; chlorine:MC-LR molar ratio=2:1; chlorination time=180 min; UV$_{254}$ dose=360 mJ/cm$^2$ in the chlorine/UV process; pH=7.5).
Figure 10:
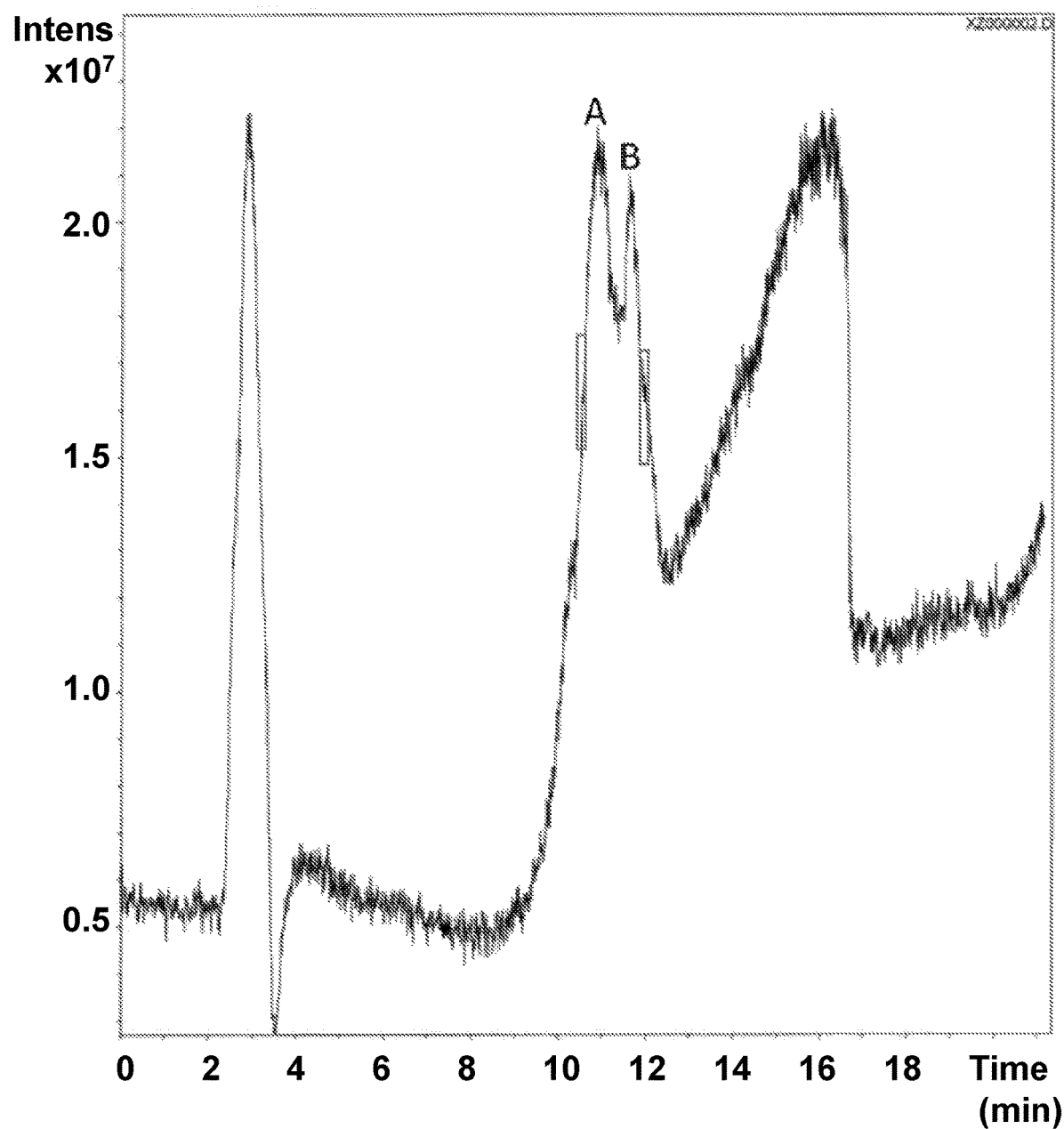
FIG. 10 illustrates a total ion chromatogram resulting from chlorination of an aqueous solution of MC-LR. Conditions of the experiment included a 2:1 Chlorine:MC-LR molar ratio, 180 mins of chlorine exposure. Peak A comprises a group of byproducts of chlorination; Peak B comprises the parent compound (MC-LR) as well as some byproducts of chlorination. Red boxes illustrate elution time ranges used to develop mass spectra that are illustrated in FIGS. 11 and 12.

Identification of Reaction Byproducts:

FIGS. 2A and 2B present mass spectra of MC-LR byproducts resulting from the chlorination and the chlorine/UV process, respectively. The experiments were conducted at a chlorine:MC-LR molar ratio of 2:1 for 180 min chlorination, with or without 360 $mJ/cm^2$ of $UV_{254}$ irradiation. The peak cluster at or around m/z 993.8 matched well with the pattern predicted by Isotope Pattern Calculator V4.0 for MC-LR. Six different by-products and their isomers were preliminarily identified, as summarized in Table 1. The total ion chromatogram represented in FIG. 10 also confirmed the presence of MC-LR, as well as an array of MC-LR by-products.

TABLE 1

Characteristics of MC—LR and its reaction by products generated in chlorination and the chlorine/UV process

| Compound | Proposed chemical formula | Experimental m/z ratio[a] | Theoretical m/z ratio[b] |
|---|---|---|---|
| MC—LR | $C_{49}H_{74}N_{10}O_{12}$ | 993.8 | 993.5 |
| Monohydroxy-MC—LR | $C_{49}H_{75}N_{10}O_{13}$ | 1009.8 | 1010.6 |
| Dihydroxy-MC—LR | $C_{49}H_{76}N_{10}O_{14}$ | 1027.7 | 1027.6 |
| Monochloro-MC—LR | $C_{49}H_{73}N_{10}O_{12}Cl$ | 1027.7 | 1027.5 |
| Monochloro-hydroxy-MC—LR | $C_{49}H_{74}N_{10}O_{13}Cl$ | 1045.8 | 1045.5 |
| Trihydroxy-MC—LR | $C_{49}H_{77}N_{10}O_{15}$ | 1045.8 | 1045.6 |
| Monochloro-dihydroxy-MC—LR | $C_{49}H_{75}N_{10}O_{14}Cl$ | 1061.7 | 1062.5 |
| Dichloro-MC—LR | $C_{49}H_{72}N_{10}O_{12}Cl_2$ | 1061.7 | 1062.5 |
| Tetrahydroxy-MC—LR | $C_{49}H_{78}N_{10}O_{16}$ | 1061.7 | 1062.6 |
| Monochloro-trihydroxy-MC—LR | $C_{49}H_{76}N_{10}O_{15}Cl$ | 1078.7 | 1079.5 |
| Dichloro-hydroxy-MC—LR | $C_{49}H_{73}N_{10}O_{13}Cl_2$ | 1078.7 | 1079.5 |
| Dichloro-dihydroxy-MC—LR | $C_{49}H_{74}N_{10}O_{14}Cl_2$ | 1094.7 | 1096.5 |
| Trichloro-MC—LR | $C_{49}H_{71}N_{10}O_{12}Cl_3$ | 1094.7 | 1096.4 |

[a]Obtained from the Agilent 6320 mass spectrometer.
[b]Calculated using data from Isotope Pattern Calculator, v4.0.

Figure 11:
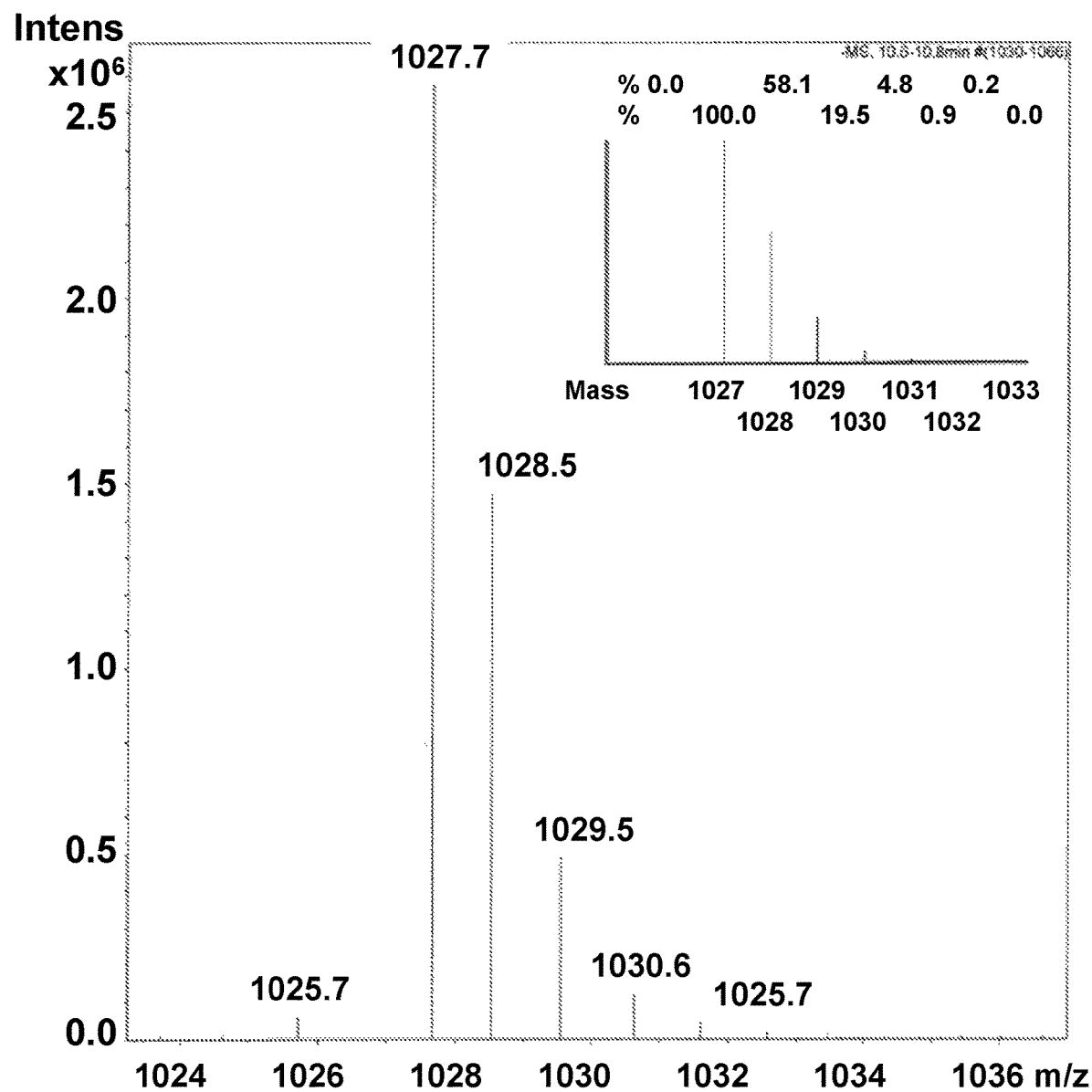
FIG. 11 illustrates a mass spectrum based on signal from LC/MS corresponding to elution times ranging from 10.6-10.8 min in FIG. 10, corresponding to the left edge of peak A. Inset image represents relative mass spectrum for dihydroxy MC-LR ($C_{49}H_{75}N_{10}O_{14}$), as calculated using Isotope Pattern Calculator, v 4.0.
Figure 12:
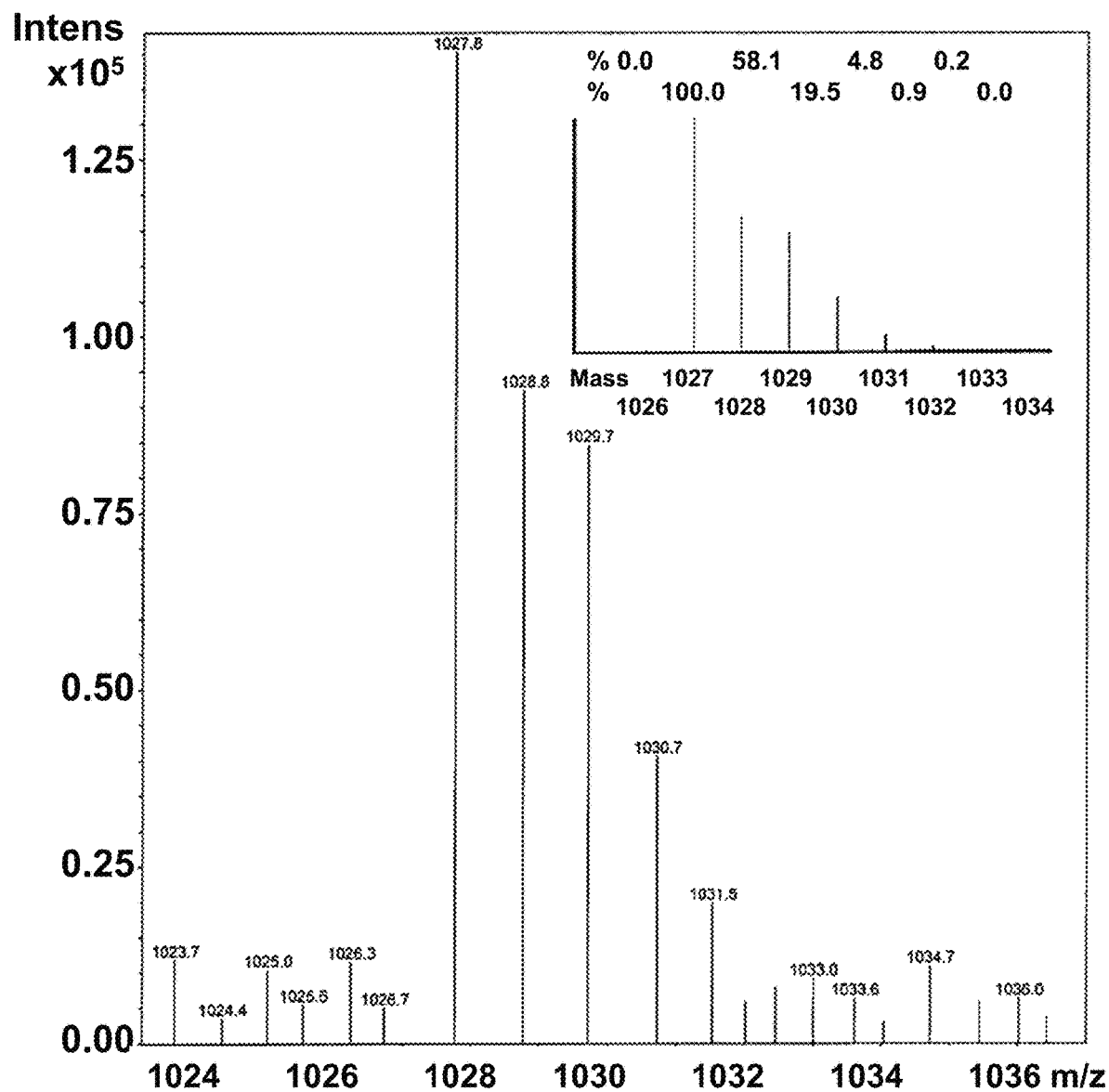
FIG. 12 illustrates a mass spectrum based on signal from LC/MS corresponding to elution times ranging from 11.9-12.1 min in FIG. 10, corresponding to the right edge of peak B. Inset image represents relative mass spectrum for monochloro MC-LR ($C_{49}H_{72}N_{10}O_{12}Cl$), as calculated using Isotope Pattern Calculator, v 4.0.

As shown in FIG. 2, the cluster near m/z ratio 1027.7 was the most abundant in both spectra. The characteristic m/z ratio 1027.7 could be identified as monochloro-MC-LR and dihydroxy-MC-LR, supported by the concordance between experimental and theoretical isotopic mass spectra, as presented in FIGS. 11 and 12, respectively. Dihydroxy-MC-LR involves addition of two hydroxyl moieties on the conjugated diene structure of the Adda group, as proposed previously (Tsuji et al., (1997) *Toxicon* 35: 1033-1041; Acero et al., (2005) *Water Res.* 39: 1628-1638). Monochloro-MC-LR is consistent with the substitution of one hydrogen atom by a chlorine atom on a terminal amino group (Ho et al., (2006) *Water Res.* 40: 1200-1209).

FIG. 2B revealed qualitatively similar peak clusters as those presented in FIG. 2A. The abundance signals corresponding to the polyhydroxy and polychlorinated MC-LR derivatives all decreased relative to the non-irradiated sample, which is consistent with FIG. 9. The LC/MS signal was not used for quantitative analysis of the dynamics of MC-LR decay; however, the patterns of behavior illustrated in FIGS. 2A and 2B are consistent with the decay of the Total MC-LR signal illustrated in FIG. 1.

It has been proposed that MC-LR would be transformed into dihydroxy-MC-LR, monochloro-MC-LR, and monochloro-hydroxy-MC-LR with the addition of chlorine (Merel et al., (2009) *Chemosphere* 74: 832-839). Subsequently, dihydroxy-MC-LR and monochloro-MC-LR would react with chlorine to generate monochloro-dihydroxy-MC-LR, whereas the monochloro-hydroxy-MC-LR will yield trichloro-hydroxy-MC-LR. Most byproducts obtained in this study were consistent with previous findings, although dichloro-MC-LR and trichloro-MC-LR have not been reported previously.

Although MS analyses of samples do not provide definitive indications of the locations of chlorine substitution, the conclusions of MS analysis were in good agreement with the results of residual chlorine analysis as discussed above, supporting the assumption of formation of N-chloro MC-LR. Indeed, the arginine moiety includes N—H bonds that represent likely sites for reactions with chlorine within the MC-LR molecule. Merel et al. (2009) suggested that the arginine group could be responsible for half the chlorine demand of MC-LR (Merel et al., (2009) *Chemosphere* 74: 832-839). Chlorination of arginine (as the first step in the chlorine/UV process) also supports this hypothesis (Weng & Blatchley III (2013) *Environ. Sci. Technol.* 47: 4269-4276).

The conventional view of the chlorine/UV process as an advanced oxidation process first involves photolysis of free chlorine to yield HO. and Cl. radicals, which go on to react with other molecules in solution (Jin et al., (2011) *Water Res.* 45: 1890-1896). However, at low chlorine:MC-LR molar ratios, such as those used in this study, free chlorine will be rapidly consumed by reaction with MC-LR and therefore would have been absent at the time of $UV_{254}$ irradiation. Therefore, the conventional view of the chlorine/UV process cannot be used to describe the results of the experiments described herein.

Figure 3:
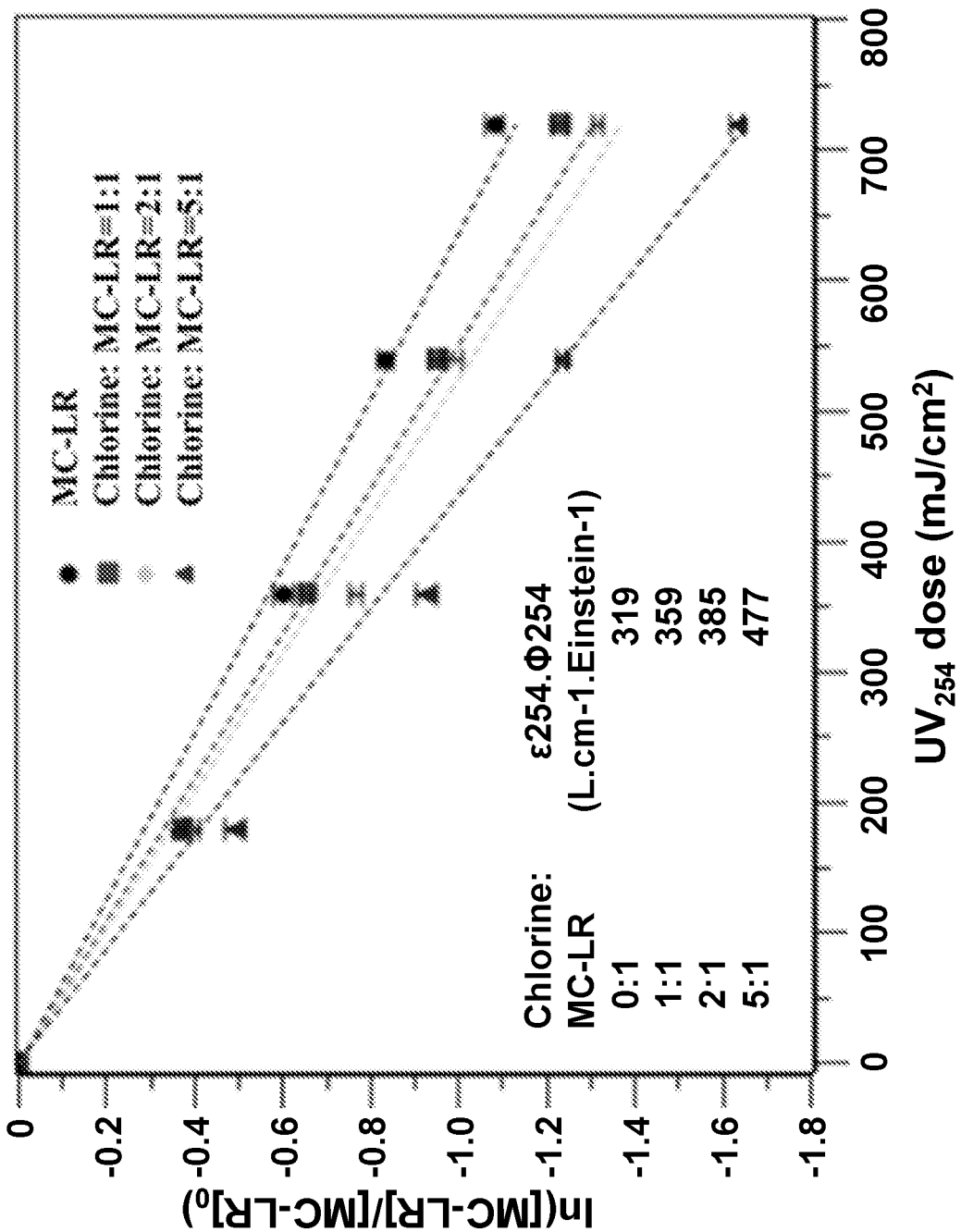
FIG. 3 is a graph illustrating pseudo first-order kinetic plots for photolysis of MC-LR at different chlorine and MC-LR molar ratio. ([MC-LR]$_0$=2.00×10$^{-6}$ mol/L; UV$_{254}$ irradiance=1.00×10$^{-4}$ W/cm$^2$; initial pH=7.78).

The alternative reaction pathway of the methods of the present disclosure employs a sequential step method involving pre-chlorination of MC-LR to promote the subsequent photolysis. At low chlorine:MC-LR molar ratios (5:1 or less), pre-chlorination alters the structure of MC-LR by addition and substitution reactions. The products of chlorination were found to be more sensitive to $UV_{254}$ irradiation than MC-LR (FIG. 3).

For dilute solutions subjected to collimated radiation, the kinetics of a pure photolytic process can be described as follows:

$$\frac{d[M]}{dt} = -2.303 \cdot E_{254} \cdot \varepsilon_{254} \cdot \Phi_{254} \cdot [M] \cdot \frac{1000 \text{ cm}^3}{L}$$

where [M]=concentration of target compound (mole/L), $E_{254}$=$UV_{254}$ irradiance (einstein/cm$^2$·s), $\varepsilon_{254}$=molar absorptivity (L/mole·cm), and $\Phi_{254}$=quantum yield (mole/einstein) (Shen et al., (2005) *Environ. Sci. Technol.* 39: 3826-3832). The slope of the regression line through the ln-transformed data (FIG. 3) yields an estimate of the product $\varepsilon_{254} \cdot \Phi_{254}$. This product was observed to increase monotonically with chlorine:MC-LR molar ratio.

As mentioned above, at a low chlorine:MC-LR molar ratio (less than 5:1), the arginine moiety is likely to be an important reaction site in chlorination of MC-LR. Chlorination byproducts would then involve one or more N—Cl bonds, which have been demonstrated to be photolabile. The study of Li and Blatchley indicated cleavage of the N—Cl bond in the photodecomposition of inorganic chloramine (Li & Blatchley III, (2009) *Environ. Sci. Technol.* 43: 60-65). It has been demonstrated that $UV_{254}$ photodecay of compounds containing the N—Cl bond leads to the formation of aminyl radicals and chlorine radicals. The intermediate radicals may also promote the oxidation of other MC-LR moieties, thereby leading to the degradation of MC-LR (Antoniou et al., (2008) *Environ. Sci. Technol.* 42: 8877-8883; He et al., (2014) *Environ. Sci. Technol.* 48: 4495-4504; Song et al., (2012) *Environ. Sci. Technol.* 46: 12608-12615).

This mechanism has not been accounted for in the majority of the literature that addresses the combined application of chlorine and UV irradiation for treatment. However, it appears to play an important role in MC-LR decomposition under the conditions of this study, and intentional use of these conditions may merit consideration in some treatment applications.

Figure 4:
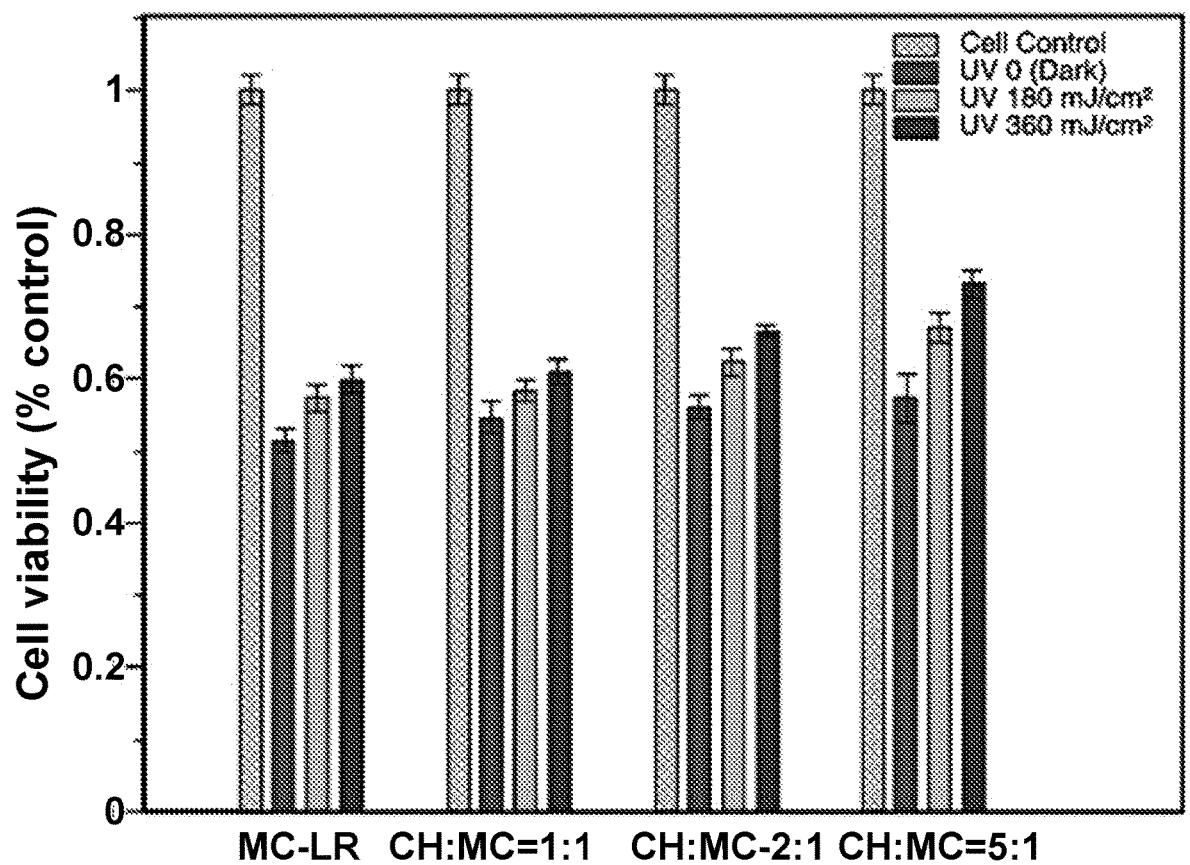
FIG. 4 is a graph illustrating MC-LR induced cytotoxicity in Hep3B cells in chlorination, UV$_{254}$ irradiation, and the chlorine/UV process. ([MC-LR]$_0$=3.30×10$^{-7}$ mol/L; chlorine:MC-LR molar ratio=1:1, 2:1 or 5:1; UV$_{254}$ dose=0,180 mJ/cm$^2$ or 360 mJ/cm$^2$; pH of initial MC-LR solution=7.78).

The Chlorine/UV Process for MC-LR Detoxification:

FIG. 4 indicates that chlorination of MC-LR resulted in decreases of cytotoxicity at chlorine:MC-LR molar ratios up to 5:1. However, the extent of MC-LR detoxification by chlorination was substantially lower than the extent of MC-LR decomposition (FIG. 1). It has been reported that the reduction of MC-LR toxicity is at least partially attributable to the chlorine-assisted di-hydroxy addition to this diene structure of the Adda moiety (Daly et al., (2007) *Environ. Sci. Technol.* 41: 4447-4453). The data presented in FIG. 2, as well as in FIGS. 11 and 12, indicate the formation of a mixture of products, including Cl and OH-substituted MC-LR at a relative low chlorine:MC-LR ratio. While not wishing to be bound by any one theory, it may be inferred that MC-LR byproducts and parent MC-LR both contribute to cytotoxicity (Zong et al., (2013) *J. Hazard. Mater.* 252, 293-299; Daly et al., (2007) *Environ. Sci. Technol.* 41: 4447-4453). Previous studies have indicated that $UV_{254}$ irradiation could promote detoxification via photoisomerization and photodecomposition of the Adda moiety of MC-LR (Tsuji et al., (1995) *Toxicon* 33: 1619-1631; He et al., (2015) *Water Res.* 74, 227-238). However, the results presented in FIG. 4 indicate only a modest increase of cell viability resulting from $UV_{254}$ exposure, thereby suggesting that the $UV_{254}$ dose applied in this study was insufficient for MC-LR detoxification.

Chlorination of MC-LR followed by $UV_{254}$ irradiation resulted in improved detoxification, relative to chlorination or $UV_{254}$ irradiation alone. A consistent pattern of cytotoxicity decrease was observed with increasing chlorine:MC-LR molar ratio and $UV_{254}$ dose. The experimental results indicated that the products of MC-LR formed in the chlorine/UV process express less toxicity towards Hep3B cells than products formed in either chlorine or $UV_{254}$ irradiation alone. As discussed above, in the chlorine/UV process, chlorination of MC-LR led to the formation of polyhydroxy and polychloro MC-LR derivatives; subsequent $UV_{254}$ exposure further enhanced the decomposition of these MC-LR derivatives.

Structural changes of Adda are believed to affect the ability of MC compounds to bind to cells, thereby decreasing their toxicity toward liver cells (Jiang et al., (2014) *Environ. Sci. Technol.* 48: 12164-12172). In addition, several previous studies have indicated that intermediate radicals could promote detoxification by oxidization the diene bonds of the Adda moiety (Onstad et al., (2007) *Environ. Sci. Technol.* 41: 4397-4404; Zong et al., (2013) *Water Res.* 47: 3211-3219).

Figure 5:
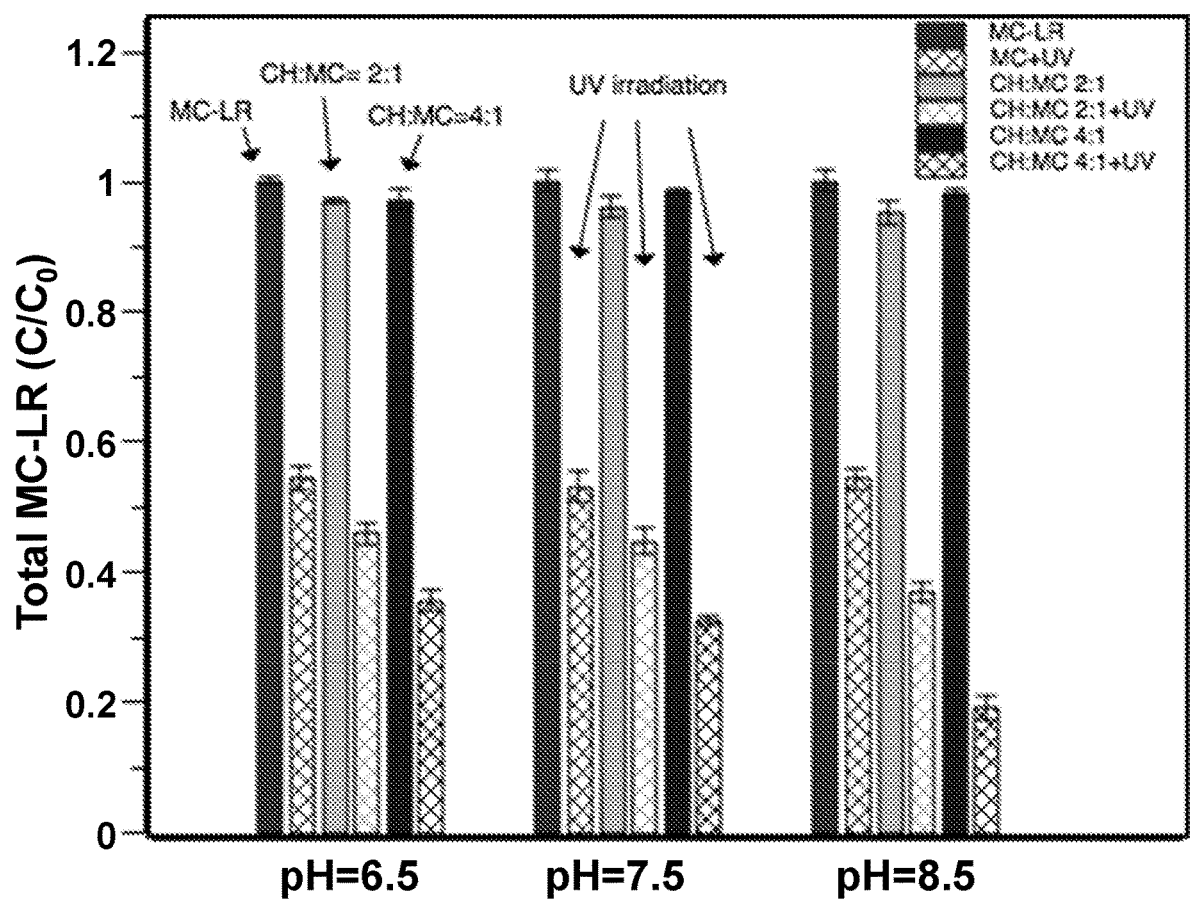
FIG. 5 is a graph illustrating the effects of pH on MC-LR decomposition in chlorination, UV$_{254}$ irradiation, and the chlorine/UV process. ([MC-LR]$_0$=2.00×10$^{-6}$ mol/L; chlorine:MC-LR molar ratio=2:1 or 4:1; chlorination time=180 min; UV$_{254}$ dose=360 mJ/cm$^2$; phosphate buffer=0.01 mol/L).

Effects of pH on MC-LR Decomposition and Detoxification:

As shown in FIG. 5, Total MC-LR concentration by chlorination alone was not altered substantially in the pH-buffered solutions for pH values of 6.5, 7.5, and 8.5, for chlorine:MC-LR molar ratios of 0:1-4:1. Previous studies have indicated that hypochlorous acid was the primary reactive species in chlorination of MC-LR at chlorine:MC-LR molar ratio of 20:1 (Merel et al., (2009) *Chemosphere* 74: 832-839) and 200:1 (Acero et al., (2005) *Water Res.* 39: 1628-1638). In this study, little or no free chlorine was present at chlorine:MC-LR molar ratio up to 4:1. Therefore, the pH-dependence of free chlorine for MC-LR decomposition was not relevant to the subsequent photodecay. The dynamic behavior of Total MC-LR illustrated in FIG. 5 was not in accordance with the results presented in FIG. 1, probably due to the addition of phosphate buffer and the strong acid or base for pH adjustments in the experiments that yielded the latter data set. The experimental results presented in FIG. 5 also indicate that pH did not substantially affect MC-LR decomposition in $UV_{254}$ induced photolysis in the absence of pre-chlorination.

For the chlorine/UV process, MC-LR decomposition increased from 64% to 83% as pH increased from 6.5 to 8.5 at chlorine:MC-LR ratio of 4:1 and $UV_{254}$ dose of 360 mJ/cm$^2$. This result suggests that an alkaline environment was conducive to chlorinated MC-LR photodegradation, and this trend became increasingly evident as chlorine:MC-LR molar ratio and $UV_{254}$ dose increased. The response of the chlorine/UV process to pH changes was different from the pH effect on chlorination alone, as mentioned above. A more plausible explanation is that the extent of protonation of amine groups in the MC-LR molecule changed with pH and that these changes altered the dynamics of the $UV_{254}$-induced photodecay by increasing $\varepsilon_{254}$, $\Phi_{254}$, or both. Ho et al. indicated that pH could affect protonation of amino acids, thereby altering the locations of chlorine attack within MC molecules (Ho et al., (2006) *Water Res.* 40: 1200-1209).

Figure 6:
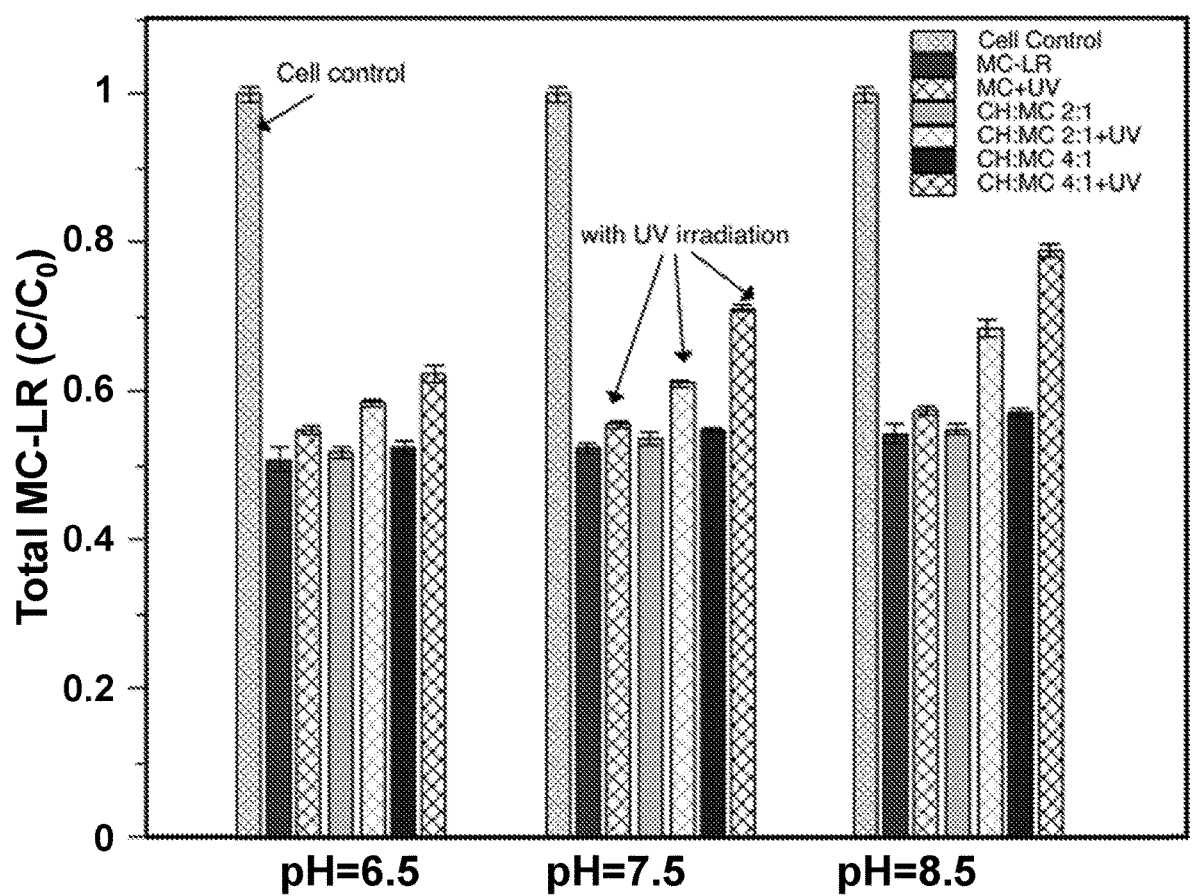
FIG. 6 is a graph illustrating the effects of pH on cytotoxicity for Hep3B cells chlorination, UV$_{254}$ irradiation, and the chlorine/UV process. ([MC-LR]$_0$=3.30×10$^{-7}$ mol/L; chlorine:MC-LR molar ratio=2:1 or 4:1; UV$_{254}$ dose=0 or 360 mJ/cm$^2$; phosphate buffer solutions=0.01 mol/L).

As shown in FIG. 6, the viability of Hep3B cells treated by MC-LR at an initial concentration of 3.30×10$^{-7}$ M remained essentially constant at roughly 50% for each pH condition. Moreover, the effects of pH on detoxification of MC-LR by chlorination and $UV_{254}$ irradiation alone were also modest, which was consistent with trend of the pH effect on MC-LR decomposition as presented in FIG. 5.

On the other hand, alkaline conditions yielded substantial increases in cell viability in the chlorine/UV process, relative to the other treatments. As illustrated in FIG. 6, relative cell viability of Hep3B increased from 60% at pH 6.5 to roughly 80% at pH 8.5 at molar ratio 4:1 and $UV_{254}$ irradiation 360 mJ/cm$^2$. This effect became increasingly evident with increasing chlorine:MC-LR molar ratio. These results were consistent with the decreases of the MC-LR signal that were observed in alkaline solution by the same process, as illustrated in FIG. 5. The experimental data suggested that the toxicity of the decomposition byproducts of MC-LR in the chlorine/UV process were apparently lower than the parent compound.

Environmental Significance:

Blooms of cyanobacteria are becoming increasingly common in surface waters that function as drainage for agricultural land as a result of nutrient inputs (de Figueiredo et al., (2004) *Ecotox. Environ. Safe.* 2004). These blooms have the potential to render drinking water supplies unfit for human consumption (Zamyadi et al., (2012) *Water Res.* 46: 1511-1523). As such, remedial measures are needed to reduce the concentration and associated toxicity of MCs and their derivatives in waters that have been affected by harmful algal blooms.

Most urban areas rely on surface waters as their source of drinking water. The inclusion of UV irradiation as a form of water treatment has become a common strategy among potable water production facilities that rely on surface water sources, in large part because UV is the disinfectant of choice for inactivation of protozoan parasites, such as *Cryptosporidium parvum* and *Giardia lamblia*. Chlorination is generally included as a secondary disinfectant in these systems to provide complementary disinfection and to provide a disinfectant residual.

Although the nominal UV design dose for disinfection systems is considerably lower than the doses applied in this study, it is advantageous to employ UV photoreactors together with pre-chlorination to accomplish degradation and detoxification of MC compounds in drinking water supplies. However, for conventional UV systems that are designed with disinfection objectives in mind, the flow rate through the system should be reduced, relative to normal operating conditions. This strategy could allow an existing system to continue to produce water during a bloom event, albeit at reduce flow rates.

One aspect of the disclosure, therefore, encompasses embodiments of a method for reducing the concentration of a cyanotoxin in an aqueous liquid, the method comprising the sequential steps of: (a) adding a halogen to an aqueous liquid having a cyanotoxin contamination and (b) irradiating the aqueous liquid with ultraviolet radiation having a wavelength of between about 200 nm to about 400 nm.

In some embodiments of this aspect of the disclosure the cyanotoxin can be selected from the group consisting of a microcystin, a nodularin, an anatoxin, a cylindrospermopsin, a lyngbyatoxin, a saxitoxin, and a β-methylamino-L-alanine.

In some embodiments of this aspect of the disclosure, the cyanotoxin can be microcystin-LR.

In some embodiments of this aspect of the disclosure the method can further comprise before step (a) the step of adjusting the pH of the aqueous liquid to have a pH value greater than 7.02.

In some embodiments of this aspect of the disclosure the halogen can be chlorine.

In some embodiments of this aspect of the disclosure, the ultraviolet radiation can have a wavelength of between about 200 nm to about 280 nm In some embodiments of this aspect of the disclosure, the ultraviolet radiation can have a wavelength of about 254 nm.

In some embodiments of this aspect of the disclosure the aqueous liquid is a potable water supply.

In some embodiments of this aspect of the disclosure the molar ratio of chlorine to the microcystin-LR can be at least about 1:1.

In some embodiments of this aspect of the disclosure the pH of the aqueous liquid can be adjusted to a value between about 7.3 to about 9.5.

In some embodiments of this aspect of the disclosure the pH of the aqueous liquid can be adjusted to a value of about 8.5.

In some embodiments of this aspect of the disclosure the aqueous liquid can be irradiated with ultraviolet radiation at a dose of between about 300 mJ/cm$^2$ to about 1000 mJ/cm$^2$.

In some embodiments of this aspect of the disclosure the aqueous liquid can be irradiated with ultraviolet radiation at a dose of between about 300 mJ/cm$^2$ to about 900 mJ/cm$^2$.

In some embodiments of this aspect of the disclosure the aqueous liquid can be irradiated with ultraviolet radiation at a dose of between about 700 mJ/cm$^2$ to about 800 mJ/cm$^2$.

Another aspect of the disclosure encompasses embodiments of a method for reducing the concentration of microcystin-LR (MC-LR) in water, said method comprising the sequential steps of: (a) adjusting the pH of the water to have a pH value between about 7.5 to about 9.0; (b) adding chlorine to the water to a molar ratio of chlorine to the microcystin-LR of at least about 1:1; and (c) irradiating the water with ultraviolet radiation having a wavelength of between about 200 nm to about 400 nm at a dose of between about 300 mJ/cm$^2$ to about 900 mJ/cm$^2$.

In some embodiments of this aspect of the disclosure the ultraviolet radiation can have a wavelength of between about 200 nm to about 280 nm In some embodiments of this aspect of the disclosure the pH of the aqueous liquid can be adjusted to a value of about 8.5, the molar ratio of chlorine to the microcystin-LR is at least about 1:1 1, the ultraviolet radiation has a wavelength of between about 254 nm, and the aqueous liquid is irradiated with ultraviolet radiation at a dose of between about 300 mJ/cm$^2$ to about 800 mJ/cm$^2$.

It should be emphasized that the embodiments of the present disclosure, particularly any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following claims.

The specific examples below are to be construed as merely illustrative, and not limitative of the remainder of the disclosure in any way whatsoever. Without further elaboration, it is believed that one skilled in the art can, based on the description herein, utilize the present disclosure to its fullest extent. All publications recited herein are hereby incorporated by reference in their entirety.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified.

EXAMPLES

Example 1

Materials:

All solutions used in experiments were prepared in ultra-pure water (Thermo Fisher Scientific Inc., Waltham, Mass., U.S.). MC-LR (purity more than 95%, 1 mg/mL in ethanol) was purchased from Cayman Chemical (Ann Arbor, Mich., U.S.). MTT (3-(4,5-dimethylthiazol-2-yl)-2,5-diphenyltetrazolium bromide) was purchased from Amresco (Solon, Ohio, U.S.). Acetonitrile and formic acid were chromatographic grade and other chemicals were of the highest purity available from Sigma-Aldrich (St. Louis, Mo., U.S.). Chlorine stock solutions (1000 mg/L as $Cl_2$) were prepared by dilution of a sodium hypochlorite solution (10%, by weight). The stock solutions were stored at 4° C. in the dark for 1 week or less and tested daily for free chlorine concentration.

Example 2

Chlorine/UV Process:

Free chlorine and MC-LR solutions were freshly prepared before each experiment. The initial MC-LR concentration was $2.00 \times 10^{-6}$ mol/L (2.00 mg/L). The pH of MC-LR solutions before addition of chlorine was 7.78. Initial MC-LR decomposition experiments were conducted in unbuffered solutions in order to mitigate against participation of buffers and other inorganic ions in the reactions; pH measurements were not conducted after initiation of the reactions due to limited reaction volumes. In experiments that were designed to examine the effects of pH on MC-LR behavior, 10 mM phosphate buffer was added into MC-LR solution. The pH of solution was adjusted to 6.5, 7.5, and 8.5 by addition of 50 mM sulfuric acid or 100 mM sodium hydroxide.

Various amounts of free chlorine were added to MC-LR samples to achieve the desired chlorine:MC-LR molar ratio, ranging from 0:1 to 5:1. To confirm that chlorination of MC-LR would be essentially complete, a 180 min chlorination period was applied since Tsuji et al. (1997) demonstrated that such a time period was necessary to complete this reaction. Pre-chlorinated samples were then collected in headspace-free, gas-tight containers for subsequent UV irradiation at a characteristic wavelength of 254 nm using a flat-plate collimated beam.

Incident $UV_{254}$ irradiance was $1.00 \times 10^{-4}$ W/cm$^2$, as measured by a calibrated radiometer (IL1700, International Light Technologies, Peabody, Mass., U.S.). $UV_{254}$ doses applied in the experiments ranged from 0 to 720 mJ/cm$^2$ for exposure times ranging from 0 to 120 min. The actual $UV_{254}$ doses delivered to the samples would have been slightly lower than these values because of the effects of reflection and absorbance, which were not accounted for. The collimated beam system used in these experiments has been described previously. Water samples were collected periodically for determination of MC-LR concentration and cytotoxicity, as described below. All experiments were conducted in triplicate and the values were expressed as mean±standard deviation (SD) from the replicate measurements.

Example 3

Detection Method:

Free chlorine and total chlorine concentrations were determined by the DPD/KI colorimetric method (4500-Cl G) (APHA, Standard methods for the examination of water and wastewater. (2005)). A pH meter (Thermo Orion Co., 720A, USA) was applied for solution pH measurements. Absorption spectra of samples were measured with a UV-Visible spectrophotometer (Cary 300 BIO, Agilent Technologies, CA, U.S.).

A high-performance liquid chromatography (HPLC) system (Surveyor, Thermo Scientific, FL, U.S.) equipped with an Acclaim PepMap100 C18 column (250 mm×1.0 mm I.D., 5 μm particle size) was used to measure MC-LR concentration (Merel et al., (2009) *Chemosphere* 74: 832-839). The HPLC mobile phase was $CH_3CN/H_2O/TFA$ (60:40:0.1). Sample injection volumes were 20 μL with a flow rate of 1.0 mL/min. Detection was performed using a photodiode array at 238 nm. The detection limit of MC-LR concentration was $0.05 \times 10^{-9}$ mol/L (0.05 μg/L).

Liquid chromatography/mass spectrometry (LC/MS) was applied for identification of MC-LR byproducts (Merel et al., (2009) *Chemosphere* 74: 832-839). The LC/MS system comprised an Agilent 1200 HPLC and an Agilent 6320 Mass Spectrometer equipped with an electrospray ionization source (Santa Clara, Calif., USA). An Acclaim Mixed-Mode HILIC-1 reverse phase column (2.1×150 mm, 3 μm, 120 Å, Thermo Scientific, FL, U.S.) was used. Sample injection volumes were 20 µL with a flow rate of 0.2 mL/min. The mobile phase A was water containing 0.1% v/v formic acid, and the mobile phase B was acetonitrile. Gradient elution was A/B of 80%:20% for 2 min, followed by A/B of 65%:35% to 8 min, then held A/B of 10%:90% for an additional 7 min. Detection was performed using a photodiode array (PDA) at 238 nm. Mass spectra (m/z 200 to m/z 1300) were obtained in negative ion mode, which yielded a higher signal:noise ratio than the positive ion mode.

MTT (3-(4,5-dimethylthiazol-2-yl)-2,5-diphenyltetrazolium bromide) is used in a quantitative, colorimetric assay of mammalian cell survival and proliferation. The assay detects living, but not dead cells and the signal generated is dependent on the degree of activity of the cells. This method can therefore be used to measure cytotoxicity, proliferation, or activation. Advantages of the MTT assay include speed and precision, and the lack of use of radioisotopes. Viable cells absorb the MTT substrate and through mitochondria metabolism reaction. The MTT substrate will convert MTT into a purple-colored formazan with an absorbance maximum near 595 nm. When cells die, they lose the ability to convert MTT into formazan. High formazan concentration indicates rapid cell growth rate.

In toxicity experiments, viable cells (Hep3B or NIH3T3) were seeded into 96-well plates at 5000 cells in 100 µL culture medium per well and incubated at 37° C. in a 5% $CO_2$/95% humidified air atmosphere for 24 h. The Hep3B and NIH3T3 cells were grown with Dulbecco's Modified Eagle's Medium (DMEM) (ATCC, Manassas, Va., U.S.) containing 10% (v/v) fetal bovine serum or containing 10% bovine calf serum, respectively.

Example 4

Figure 13:
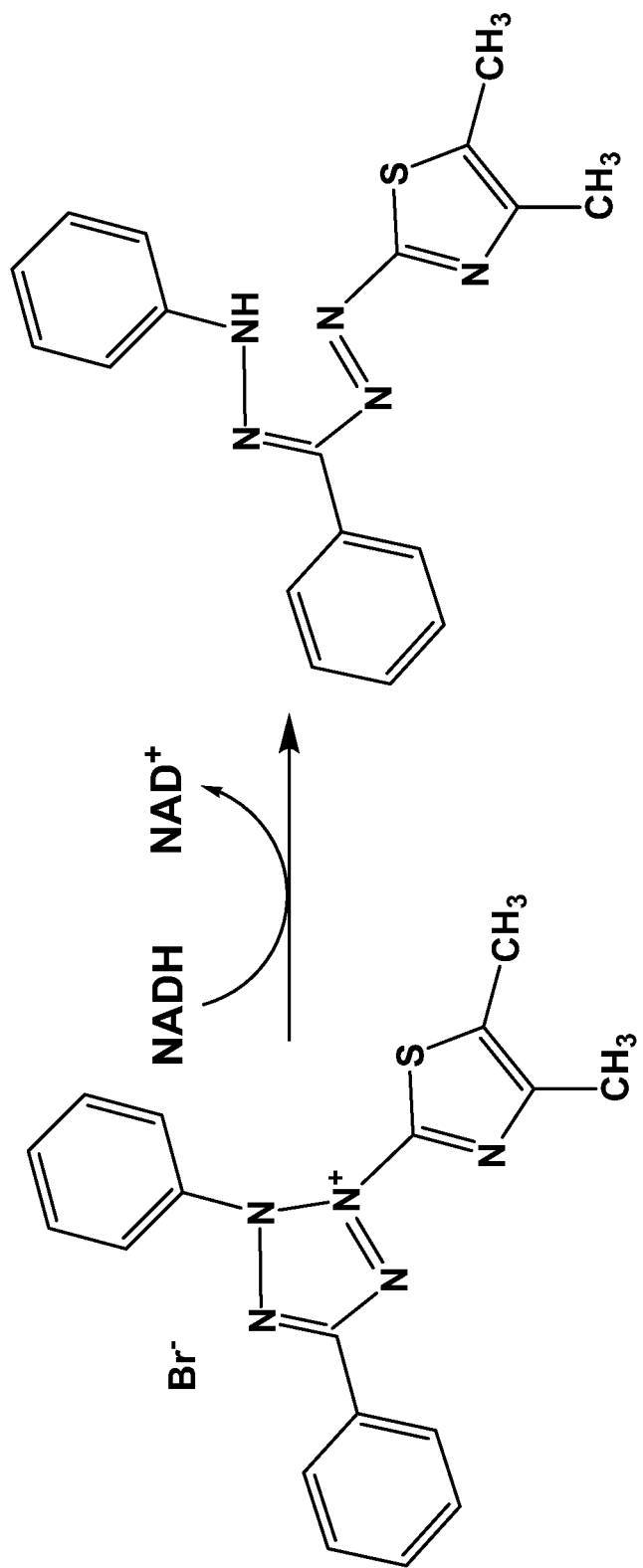
FIG. 13 illustrates the structure of MTT and the colored formazan product.

Cytotoxicity Tests:

The cytotoxicity of MC-LR and its by products were estimated using an MTT (3-(4,5-dimethylthiazol-2-yl)-2,5-diphenyltetrazolium bromide) colorimetric assay. The MTT assay is a quantitative colorimetric assay for mammalian cell cytotoxicity, proliferation, and activation (Li & Song (2007) *Phycologia* 46: 593-599; Mosmann, T., (1983) *J. Immunol. Methods* 65: 55-63). MTT assays provide a direct indication of cytotoxicity at a cellular level, which is superior to protein phosphatase inhibition assay (PP1 assay) that merely evaluates the inhibition of MC-LR on protein phosphatases enzymes (Song et al., (2005) *Environ. Sci. Technol.* 39: 6300-6305; Ho et al., (2007) *Toxicon* 50: 438-441). The mechanism and method of the MTT assay are illustrated in FIG. 13.

Both human hepatoma cells (Hep3B) (Jasionek et al., (2010) *Environ. Sci. Technol.* 2010, 44: 2535-2541) and NIH Swiss mouse embryo fibroblast cells (NIH3T3) (Chong et al., (2000) *Chemosphere* 2000, 41: 143-147) have been applied as toxicity probes in previous MC-LR toxicity studies. Hep3B cells retain some characteristics of human liver hepatocytes.

Figure 8:
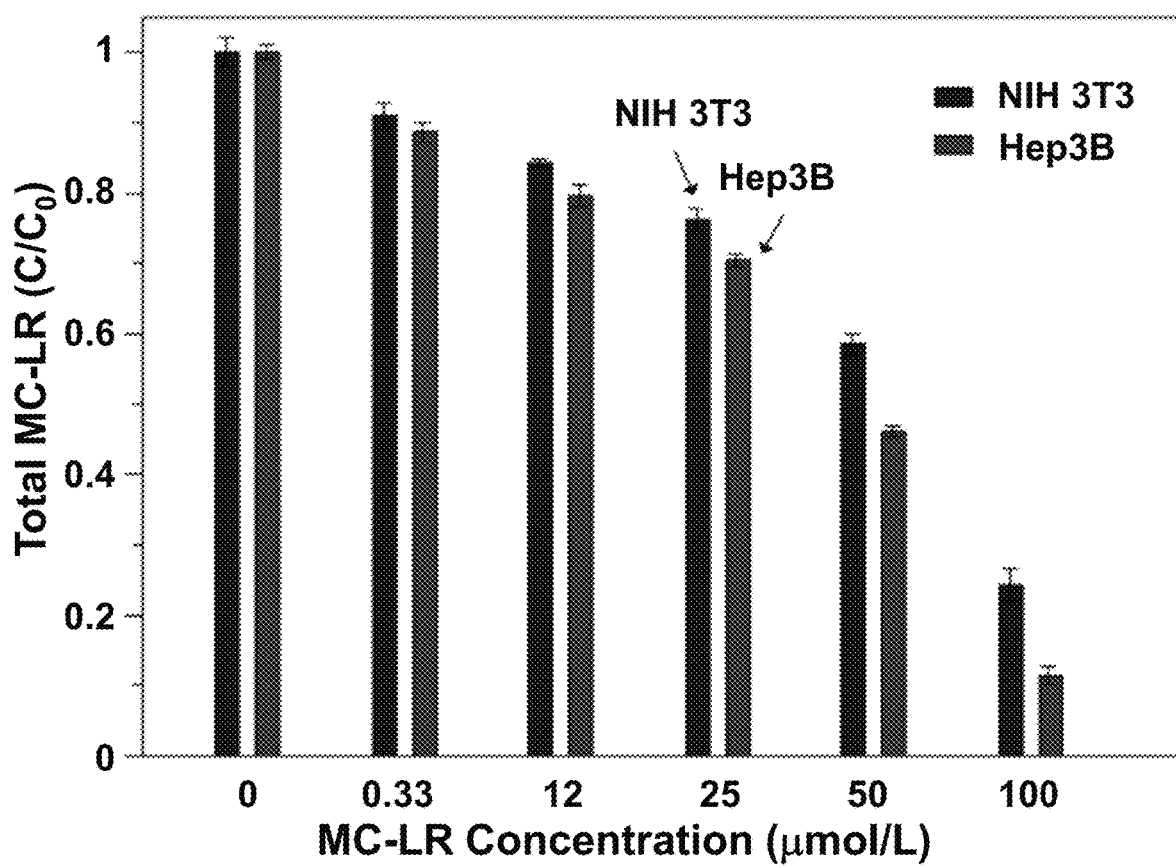
FIG. 8 is a graph illustrating cell viability as a function of MC-LR concentration for NIH3T3 cells (left bars) and Hep3B cells (right bars). Experimental conditions: 5000 cells/well; MC-LR exposure 24 hours in 37° C., 5% CO$_2$/95% humidified air atmosphere. Values are expressed as mean±standard deviation (SD) from three independent replicates.
Figure 9A:
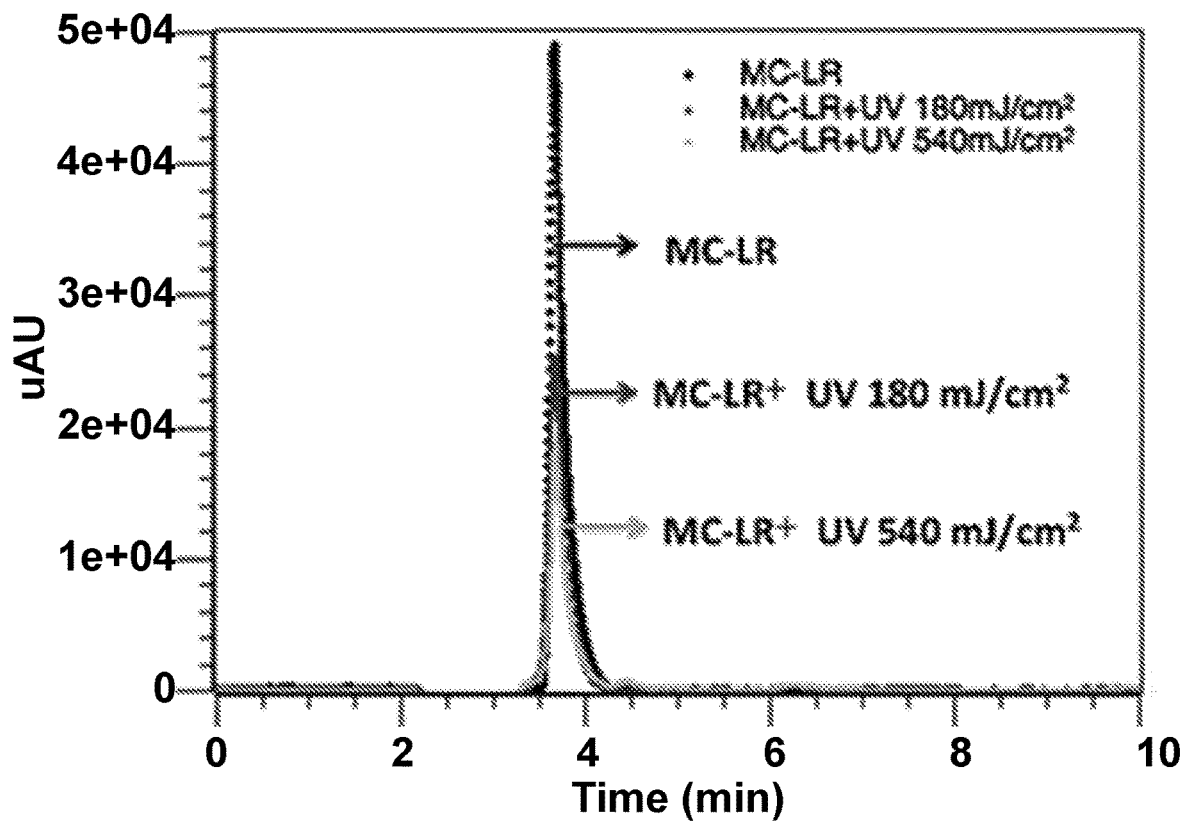
FIGS. 9A-9D show a series of graphs illustrating the effects of chlorination, UV$_{254}$ irradiation, and the chlorine/UV process on the chromatographic peak (PDA at 238 nm) of Total MC-LR.
Figure 9B:
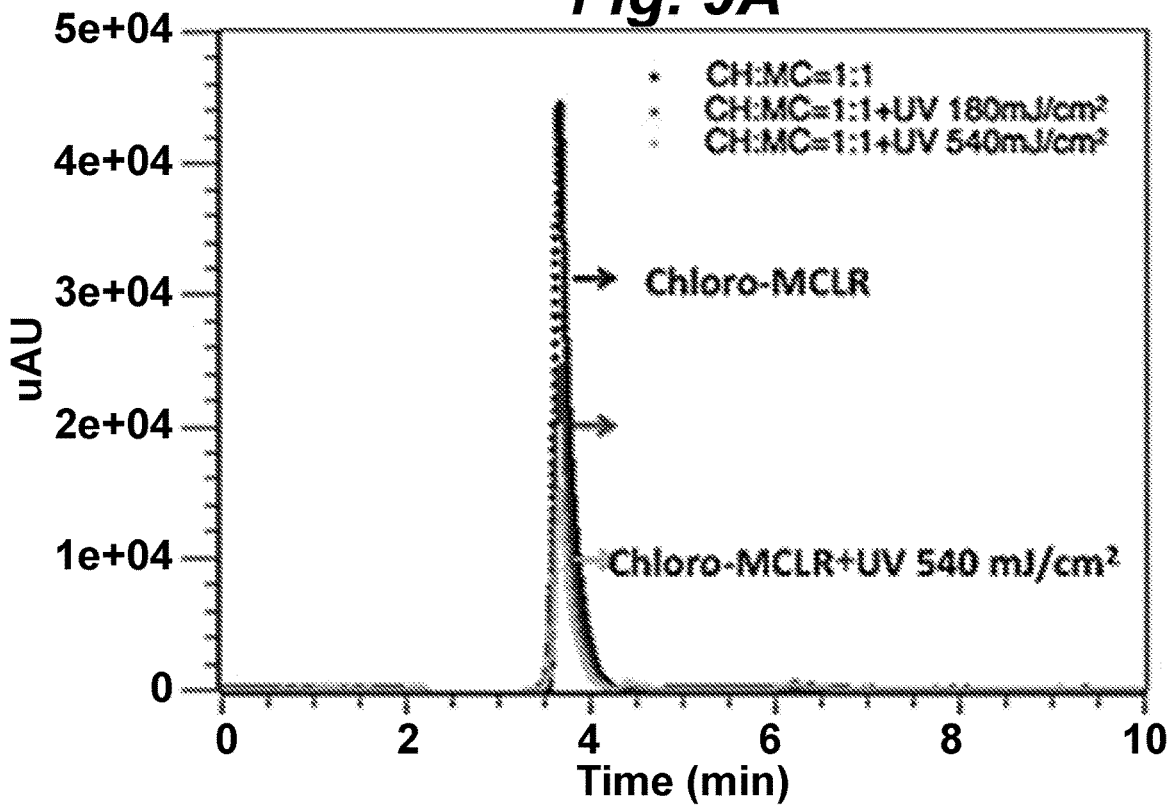
Figure 9C:
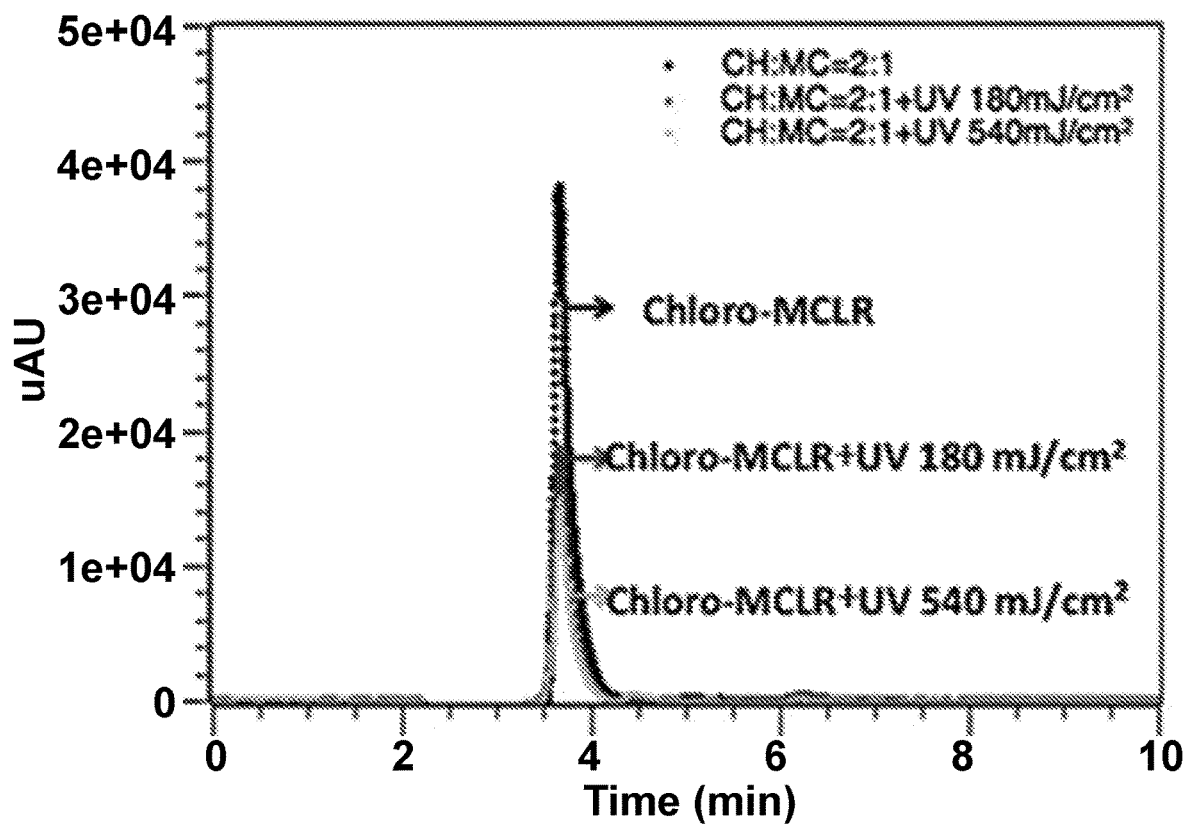
Figure 9D:
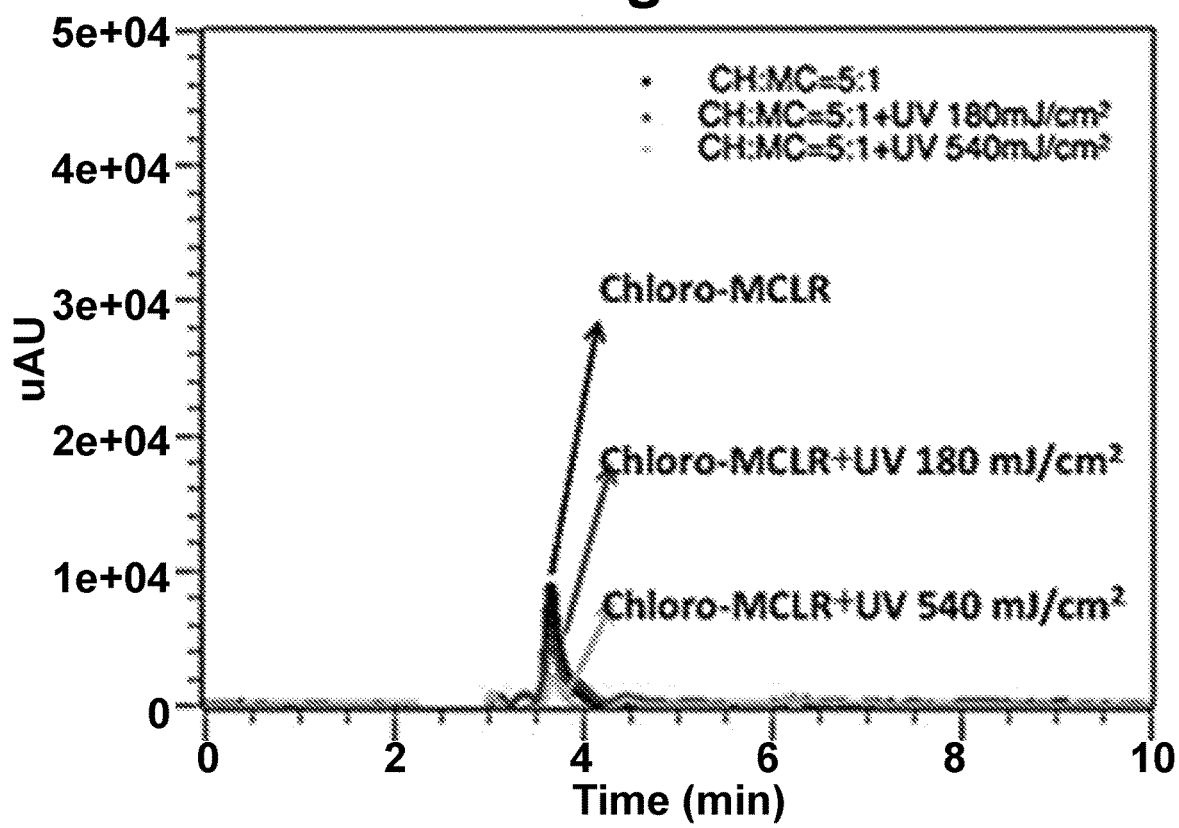

FIG. 8 illustrates the cytotoxicity of MC-LR toward Hep3B cells and NIH3T3 cells as a function of MC-LR concentration. Hep3B cells and NIH3T3 cells demonstrated similar dose-response behavior toward MC-LR. Cell viability decreased by up to 76% in NIH3T3 cells and by up to 89% in Hep3B over the range of MC-LR exposures used in this experiment. The experimental results suggested that Hep3B cells were more sensitive to MC-LR than NIH3T3 cells. Therefore, Hep3B was selected as the target cell line to assess the cytotoxicity of MC-LR and its decomposition byproducts.

We claim:

1. A method for reducing the concentration of a cyanotoxin in an aqueous liquid, said method comprising the sequential steps of: (a) halogenating cyanotoxins by adding a halogen to an aqueous liquid having a cyanotoxin contamination, wherein the molar ratio of halogen to the microcystin-LR is at least about 1:1, and (b) photolysing the halogenated cyanotoxins generated by step (a) by irradiating the aqueous liquid with ultraviolet radiation having a wavelength of between about 200 nm to about 400 nm.

2. The method of claim 1, wherein the cyanotoxin is selected from the group consisting of a microcystin, a nodularin, an anatoxin, a cylindrospermopsin, a lyngbyatoxin, a saxitoxin, and a β-methylamino-L-alanine.

3. The method of claim 1, wherein the cyanotoxin is microcystin-LR (microcystin-leucine-arginine).

4. The method of claim 1, further comprising before the step (a) the step of adjusting the pH of the aqueous liquid to have a pH value greater than 7.5.

5. The method of claim 1, wherein the halogen is chlorine.

6. The method of claim 1, wherein the ultraviolet radiation has a wavelength of between about 200 nm to about 280 nm.

7. The method of claim 1, wherein the ultraviolet radiation has a wavelength of about 254 nm.

8. The method of claim 1, wherein the aqueous liquid is a potable water supply.

9. The method of claim 1, wherein the pH of the aqueous liquid is adjusted to a value of about 8.5.

10. The method of claim 1, wherein the aqueous liquid is irradiated with ultraviolet radiation at a dose of between about 300 mJ/cm$^2$ to about 1000 mJ/cm$^2$.

11. The method of claim 1, wherein the aqueous liquid is irradiated with ultraviolet radiation at a dose of between about 300 mJ/cm$^2$ to about 900 mJ/cm$^2$.

12. The method of claim 1, wherein the aqueous liquid is irradiated with ultraviolet radiation at a dose of between about 700 mJ/cm$^2$ to about 800 mJ/cm$^2$.

13. A method for reducing the concentration of microcystin-LR (MC-LR) in water, said method comprising the sequential steps of: (a) adjusting the pH of the water to have a pH value between about 7.5 to about 9.0; (b) halogenating cyanotoxins by adding chlorine to the water to a molar ratio of chlorine to the microcystin-LR is at least about 1:1; and (c) photolysinq the halogenated cyanotoxins generated by step (b) by irradiating the water with ultraviolet radiation having a wavelength of between about 200 nm to about 400 nm at a dose of between about 300 mJ/cm$^2$ to about 900 mJ/cm$^2$.

14. The method of claim 13, wherein the ultraviolet radiation has a wavelength of between about 200 nm to about 280 nm.

15. The method of claim 13, wherein the pH of the water is adjusted to a value of about 8.5, the molar ratio of chlorine to the microcystin-LR is at least about 1:1, the ultraviolet radiation has a wavelength of between about 254 nm, and the water is irradiated with ultraviolet radiation at a dose of between about 300 mJ/cm$^2$ to about 800 mJ/cm$^2$.

* * * * *